(12) United States Patent
Rugge et al.

(10) Patent No.: US 7,555,451 B2
(45) Date of Patent: Jun. 30, 2009

(54) CASH FLOW FORECASTING

(75) Inventors: Robert D. Rugge, Everett, WA (US);
Eric A. George, Redmond, WA (US);
Sigmund Mandel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1618 days.

(21) Appl. No.: 09/859,936

(22) Filed: May 17, 2001

(65) Prior Publication Data

US 2002/0174006 A1 Nov. 21, 2002

(51) Int. Cl.
*G06Q 40/00* (2006.01)
(52) U.S. Cl. .......................... 705/36 R; 705/35; 705/38
(58) Field of Classification Search .................. 70/38, 70/26 R, 35, 36 R, 37
See application file for complete search history.

(56) References Cited

U.S. PATENT DOCUMENTS

2002/0123949 A1* 9/2002 VanLeeuwen ................ 705/35
2002/0161678 A1* 10/2002 Jaffe ............................ 705/35

OTHER PUBLICATIONS

U.S. Appl. No. 60/236,244.*

Deciding to borrow or not to borrow Allen E. Fishman. Journal Record. Oklahoma City, Okla.: May 4, 1998. p. 1.*
Finance for small and medium-sized enterprises: Information and the income gearing challenge Edwards, Pamela, Turnbull, Peter W. The International Journal of Bank Marketing. Bradford: 1994. vol. 12, Iss. 6; p. 3, 7 pgs.*
A prime time to plan for 1986: Establishing a 'cash flow forecast' for your household finances International Examiner (1976-1987). Seattle, Wash.: Mar. 19, 1986. vol. 13, Iss. 6; p. 4.*
Stahl, Ingolf, "How Should We Teach Simulation?" *Proceedings of the 2000 Winter Simulation Conference*, eds. J.A. Joines, R.R. Barton, K. Kang, and P.S. Fishwick, pp. 1602-1612.

* cited by examiner

*Primary Examiner*—Lalita M Hamilton
(74) *Attorney, Agent, or Firm*—Merchant & Gould P.C.

(57) ABSTRACT

A method and system for automatically estimating budget items based on past transactions and generating a cash flow forecast for one or more accounts. A budget item is determined for each of a plurality of categories of transactions. A frequency and amount of each budget item is determined as a function of an actual transaction count, a date span of actual transactions, and a sum of actual transaction amounts—all of the transactions occurring in the past. For each budget item, a cash flow transaction is determined as a function of a posting date criterion and a selected forecast period. A running balance of the cash flow transactions is determined and displayed. Through the display, a user is enabled to modify individual cash flow transactions to generate a new cash flow forecast, or generate an alternate cash flow forecast that can be compared to the original cash flow forecast.

43 Claims, 17 Drawing Sheets

CASH FLOW FORECASTING

FIELD OF THE INVENTION

The present invention generally relates to a method and system for forecasting an overall cash flow, and more specifically, to forecasting a cash flow for one or more accounts based on past actual transactions and budgeted future transactions.

BACKGROUND OF THE INVENTION

In a budget, the term "cash flow" refers to expenditure and income transactions occurring over a period of time, and the period of time can extend from a past date, through the present, and into the future. Starting with a known balance of money at a beginning date, each transaction is applied over the period of time to create a running balance until the ending date. Analyzing the detailed series of transactions and running balance helps people to understand income and spending patterns and recognize opportunities to improve their financial situation.

For each transaction in a cash flow, there are certain key parameters, including the amount of the transaction and the date that the transaction occurs. If the transactions are included in multiple accounts, such as a checking account and a credit card account, the account in which a transaction occurs should also be designated in the cash flow. Each transaction may also be assigned to a category that represents a type of transaction, such as "automobile expenses." For transactions that have already occurred, the payee will be known. If some transactions are set up to recur at regular intervals, then the frequency of the transactions will already be known.

It is important to distinguish between cash flow and a budget. A budget is simply an estimate of future income and expenses, without the detail of the timing of transactions that is inherent in a cash flow. Budgeted income and expenses are often compared with actual transactions as they occur. Typically, a budget will include a sum of expenses or income in a given category that is used to determine how much spending/income is expected occur over a specified time period, such as a quarter or a year. Furthermore, several of the parameters associated with cash flow transactions are often not known for budgeted income and expenses. While an amount may be estimated for a budgeted income or expense item, the transaction dates for the budgeted item within the budget period are usually not known. Similarly, a person may know the general category to which a budgeted item relates, but often does not know the specific account that will be used for an actual transaction. Thus, a budget does not enable the detailed analysis of a financial condition over time that a cash flow does. It is therefore desirable to be able to forecast a detailed cash flow to understand future income and spending patterns and recognize opportunities to improve a financial situation.

Previous attempts at forecasting have generally been limited to extending recurring transactions out into the future to determine a final account balance based only upon those transactions. Other current cash flow analysis tools provide for making simple projections, such as by simply copying past transactions into a future time period, or averaging transactions over a period of time to determine an average for the transactions into the future. However, past transactions will often not occur in the same amounts or on the same dates in the future. Also, a person may be able to plan more effectively if past transactions are first analyzed for patterns, and the amounts, categories, and relative frequency are also considered. Often an arbitrary frequency is imposed by averaging. For example, each category of actual expenses incurred over a previous year may be summed and divided by twelve to create a monthly budget item for each category of expenses. However, averaging data for a category fails to consider granular details relative to when income and expenditures occurred and thus does not consider details about the timing of transactions. Furthermore, neither copied nor averaged transactions takes into account data from a manually entered estimate of future income and expenses that may be significantly different than the past transactions. Also, additional complexity is introduced in the forecasting of transactional data when the cash flow forecast involves multiple accounts.

It is therefore desirable to enable automatic analysis of past transactions to identify patterns useful for automatically generating a budget usable for creating a detailed cash flow forecast. Also, it is desirable to enable a person to provide alternate estimates of transactions that can be used in the automatically produced budget to create modified detailed cash flow forecast. It is further desirable that such a cash flow forecast accurately predict income and expenditure transactions in multiple categories and for one or more selected accounts. Another desirable feature would be to enable a person to select a number of criteria that govern how a cash flow forecast is derived, and to carry out dynamic "what-if" scenarios to derive cash flow forecasts on-the-fly by changing transactions. Yet another desirable feature would be to provide a person with an interface that displays cash flow forecast both graphically and as a list of transactions, enabling the person to modify the graphical and list displays by selecting from among various options. For example, a person should be able to select a portion of a line in the graphical display to obtain a list of transactions corresponding to the selected portion. Conversely, the person should be able to edit a value in the list of transactions, causing the cash flow forecast to be recalculated and the graphical display updated to reflect the change.

SUMMARY OF THE INVENTION

The present invention automatically generates a cash flow forecast over a selected forecast period by analyzing a combination of prior actual transactions to develop an autobudget and then uses the budget to develop a daily forecast of transactions over a selected period for one or more accounts. Preferably, a budget item is determined for each of a plurality of categories of transactions. A frequency and amount of each budget item is determined as a function of a count of prior transactions, a date span for the prior transactions, and a sum of the prior transaction amounts. The present invention also preferably uses manually entered budget items in addition to budget items developed in the autobudget. For each budget item, a cash flow transaction is determined as a function of the budget items and a selected forecast period. The cash flow transactions define the cash flow forecast. Although the invention can be applied to any forecast period, including a forecast period entirely in the past, the invention is most relevant when at least a portion of the forecast period extends into the future.

Preferably, the frequency of each budget item is determined by analyzing the grouping and spread of prior transactions over the most recent year. A number of rules are applied to the count and date span of prior transactions to determine the frequency. For example, an annual frequency results when one or more prior transactions are all grouped within a two-month period. The frequency of a budget item is preferably used to scale the budget item amount over the same duration of time into the future, as the duration of time that was used to analyze prior transactions.

For each budget item, one or more cash flow transactions are created, each with a posting date based on a user selectable posting date criterion. The selectable posting date criterion determines how cash flow transactions are distributed in relation to the budget item frequency. A user may thus set the posting date criterion to create cash flow transactions at the beginning of each frequency period, the end of each frequency period, or distributed over the frequency period.

From the created cash flow transactions, a running balance is determined and displayed for the one or more selected accounts. Also displayed is a list of the cash flow transactions. Through the display, a user may modify individual cash flow transactions to generate a new cash flow forecast, or the user may generate an alternate cash flow forecast that can be compared to the original cash flow forecast.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Exemplary Operating Environment

Figure 1:
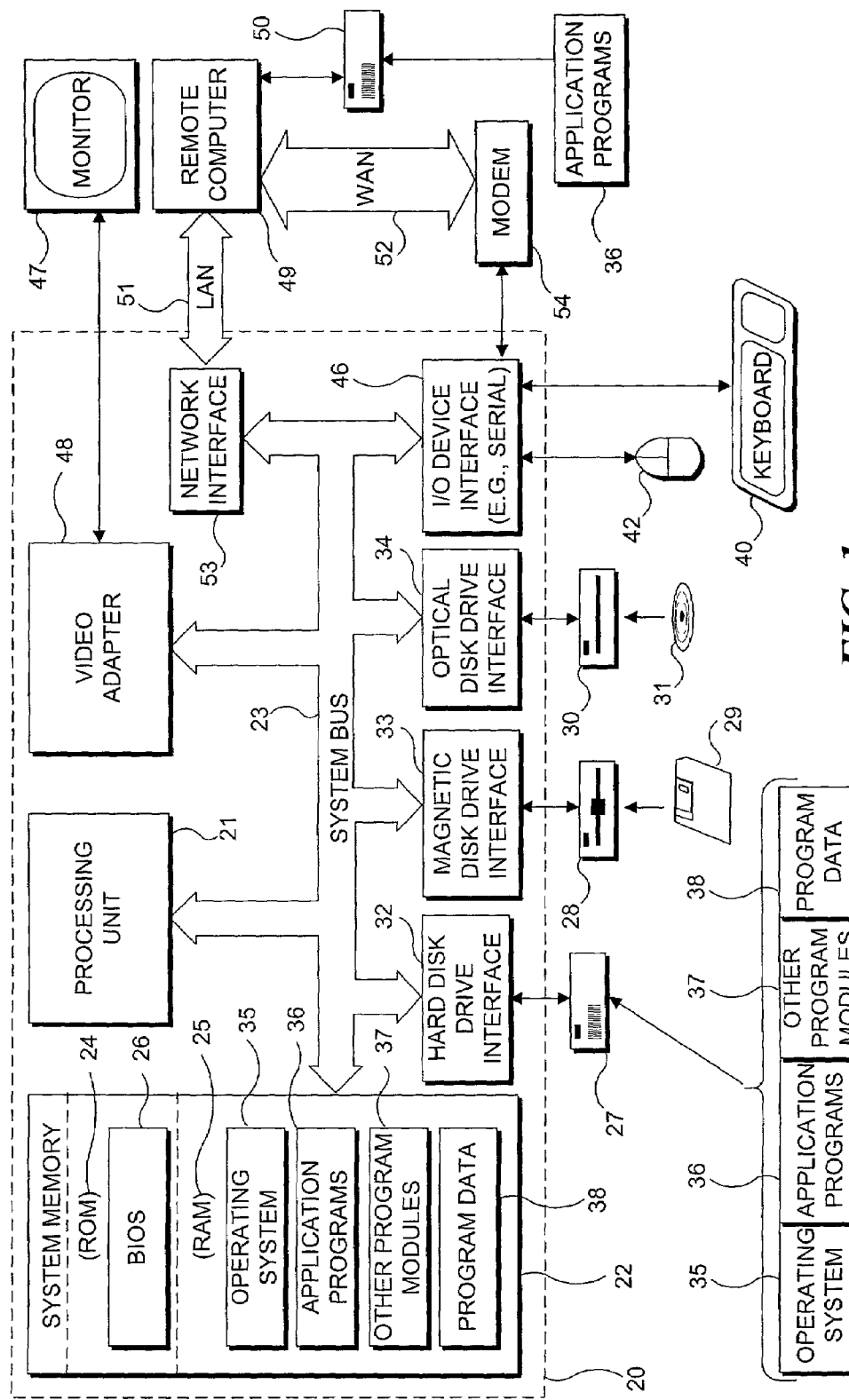
FIG. 1 is a block diagram of an exemplary system for implementing the present invention using a general purpose computing device in the form of a conventional personal computer (PC)

FIG. 1 and the following discussion are intended to provide a brief, general description of a suitable computing environment in which the present invention may be implemented. The invention may be practiced on a single computing device, on a combination of a client computing device and a server or other remote computing device connected to the client computing device through a communication network. Although not required, the present invention will be described in the general context of computer executable instructions, such as program modules that are executed by a PC. Generally, program modules include application programs, routines, objects, components, functions, data structures, etc. that perform particular tasks or implement particular abstract data types. Also, those skilled in the art will appreciate that this invention may be practiced with other computer system configurations, particularly in regard to a client device for displaying a Web page, including hand-held devices, pocket personal computing devices, digital cell phones adapted to execute application programs and to wirelessly connect to a network, other microprocessor-based or programmable consumer electronic devices, multiprocessor systems, network PCs, minicomputers, mainframe computers, and the like. As indicated, the present invention may be practiced in distributed computing environments, where tasks are performed by remote processing devices that are linked through a communications network. In a distributed computing environment, program modules may be located in both local and remote memory storage devices.

With reference to FIG. 1, an exemplary system for implementing the present invention includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that helps to transfer information between elements within PC 20 such as during start up, is stored in ROM 24. PC 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein employs a hard disk, removable magnetic disk 29, and removable optical disk 31, it will be appreciated by those skilled in the art that other types of computer readable media, which can store data that are accessible by a computer, such as magnetic cassettes, flash memory cards, digital video disks or DVDs, Bernoulli cartridges, RAMs, (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into PC 20 through input devices such as a keyboard 40 and a pointing device 42. Other input devices (not shown) may include a microphone, joystick, game pad, satellite dish, scanner, or the like. These and other input/output (I/O) devices are often connected to processing unit 21 through an I/O interface 46 that is coupled to the system bus. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48, and is usable to display application programs, Web pages, and/or other information. In addition to the monitor, PCs are often coupled to other peripheral output devices (not shown), such as speakers (through a sound card or other audio interface—not shown) and printers.

As indicated above, the invention may be practiced on a single machine. However, PC 20 preferably operates in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise wide computer networks, intranets, and for coupling to the Internet.

When used in a LAN networking environment, PC 20 is connected to LAN 51 through a network interface or adapter 53. When used in a WAN networking environment, PC 20 typically includes a modem 54, or other means for establishing communications over WAN 52, which may include the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Exemplary Implementation of the Present Invention

The following describes an exemplary implementation in a first preferred embodiment of the present invention corresponding to its use in providing a cash flow forecast. Preferably, the invention is embodied as computer-readable instructions that comprise a cash flow module of a software application program. One example of such a program is Microsoft Corporation's Money 2001™ financial program.

Typically, there will be a number of types of transactions, including completed transactions (sometimes called actual transactions), scheduled transactions (sometimes called recurring transactions or predefined bills), overdue transactions, post-dated transactions, and cash flow transactions. Completed transactions are transactions that have been entered in the appropriate account and include both unscheduled transactions (sometimes called manually-entered transactions) and scheduled transactions that have concluded. As these names imply, unscheduled transactions do not have a regular pattern of occurrence, while scheduled transactions occur at regular intervals, as defined by a user. An unscheduled transaction may be a single one-time transaction, or one of a number of a randomly occurring transactions. For example, an unscheduled transaction may be a one-time purchase of an automobile, or it may be a number of randomly occurring expenditures for car washes. In any case, certain parameters are known about an unscheduled transaction. The known parameters include the account in which the transaction occurs, the amount of the transaction, the category under which the transaction falls, the specific date of the transaction, and the payee in the transaction.

In addition to these parameters, for a scheduled transaction that is established by a user, a frequency is also known. For example, a monthly automobile loan payment is a scheduled transaction because it occurs at known defined times each month. Scheduled transactions that have not been completed are predefined to occur at recurring dates or intervals. For example, a mortgage payment can be scheduled to occur by the fifth day of each month.

Overdue transactions are transactions that were intended, or scheduled to occur on a certain date, but that date has past without completing the transaction. Alternatively, a post-dated transaction might be made by sending a postdated check to a payee, so that the intended transaction does not actually occur until the post-date on the check. Overdue and post-dated transactions may originate from unscheduled or scheduled transactions. Thus, an overdue transaction has the same parameters as an unscheduled or scheduled transaction from which the overdue transaction originates.

Cash flow transactions are transactions that define a cash flow over a desired date range. Cash flow transactions may be past instances of any of the above transactions and instances of future transactions that are determined from budget items.

Budget items are estimates of transactions. Because budget items are future estimates, they are always somewhat "scheduled." Thus, budget items are instead referred to as either one-time budget items or recurring budget items. Parameters known for one-time budget items include an estimated amount of the transaction, the category under which the transaction will fall, the payee, and either a specific date or particular month in which the transaction will occur. Similarly, an estimated amount, the payee, and the category are known for recurring budget items. However, instead of a specific single date, a frequency parameter is known for a recurring budget item, e.g., monthly.

Figure 2:
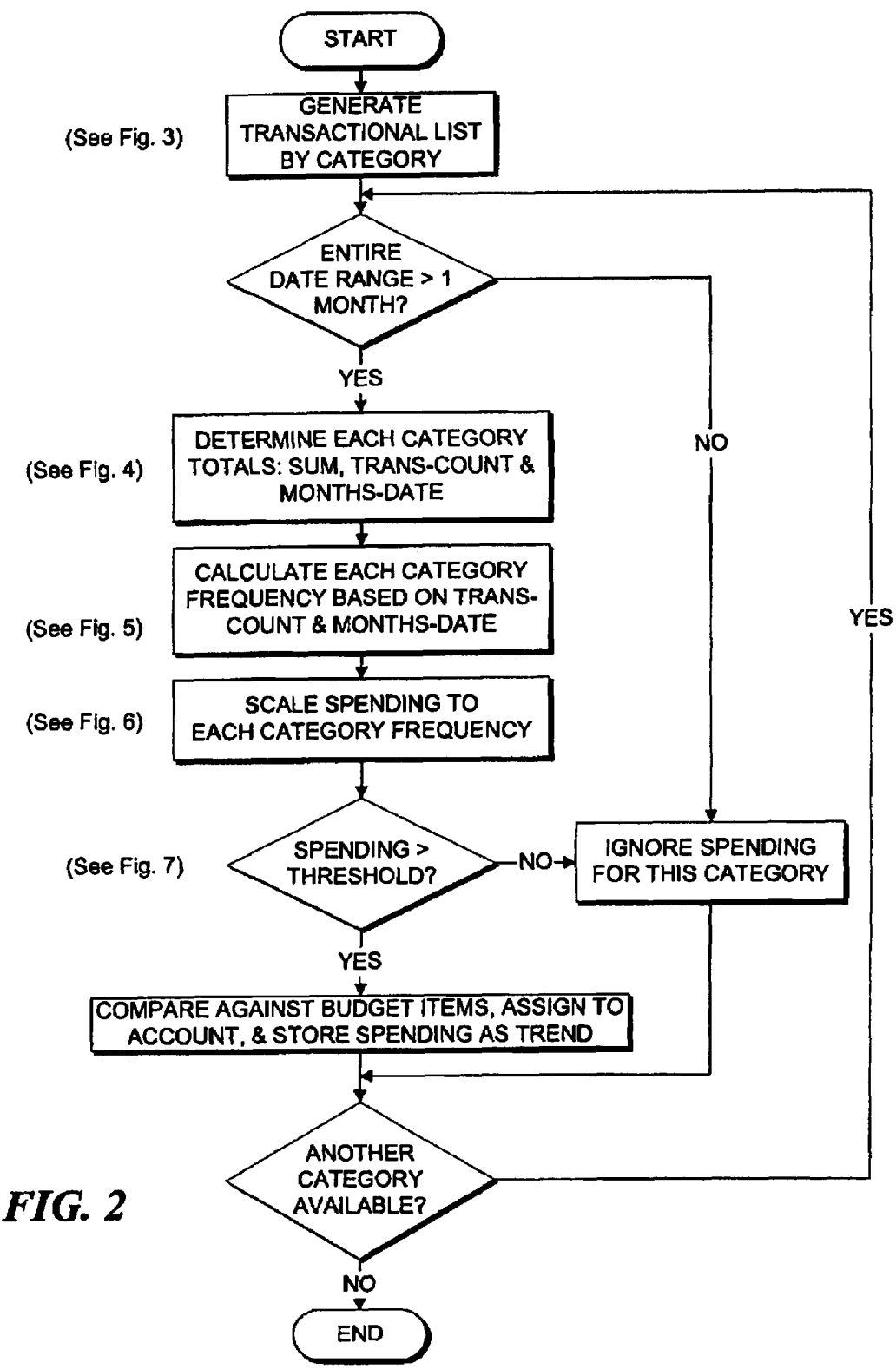
FIG. 2 is a flow diagram illustrating the overall logic of one preferred embodiment to create a cash flow forecast.

The parameters for transactions are employed in the present invention to generate an autobudget. In addition, the parameters of the autobudget, or a user-modified autobudget, are then used to generate a specific cash flow forecast. FIG. 2 illustrates the overall logical steps used in one preferred embodiment to create a cash flow forecast. At a decision step 60, the software application program determines whether a user wishes to create a budget. This option is user initiated within a software application financial program that accesses a portion of a cash flow module. If the user wants to create a new budget, the application program obtains budget criteria from the user at a step 62. Such criteria include an account or accounts for which the user wishes to create a budget, and a future date range of the budget. At a step 64a, the application program generates an autobudget based upon transactions that have occurred in the selected account(s). Details of the steps for generating the autobudget are discussed below. At a step 66, the application program enables the user to modify or edit the autobudget. The application program then stores the autobudget (with any modifications made by the user), in a step 68.

At a decision step 70, the application program detects whether a request was made by the user to generate a cash flow forecast. A cash flow module in the application program can generate a cash flow based only on past completed transactions, or based upon a combination of past completed transactions and future budget items. However, the following discussion is primarily directed to the generation of a cash flow forecast based on completed transactions. If the user wishes to generate a cash flow forecast in decision step 70, the cash flow module obtains cash flow criteria at a step 72. Like the budget criteria as noted above, cash flow criteria includes the account or accounts for which the user wishes to create a cash flow forecast, the date range of the cash flow forecast, and a posting date method to determine specific dates for which cash flow transactions will be posted. Note that the cash flow forecast date range may be different than the budget date range discussed above.

At a decision step 74, the cash flow module determines whether the user previously generated a budget. If the user previously generated a budget, the cash flow module will enable the user to choose between the existing budget and a newly generated autobudget. If the user previously created a modified budget that takes into account anticipated changes over past transactions, the user may wish to use the existing modified budget to generate a more accurate cash flow forecast. However, if the user created a modified budget sufficiently long ago in the past that the budget is likely out of date, the user may wish to generate a new autobudget to produce a more accurate cash flow forecast. In any case, the user may choose between an existing budget or a new autobudget. If the user chooses to use the existing budget, the cash flow module accesses the existing budget at a step 76. Otherwise, the cash flow module generates an autobudget at a step 64b. Further details of the step employed to generate an autobudget are provided below and shown in FIG. 3.

Using the budget selected by the user in decision step 74 of FIG. 2, the cash flow module creates a cash flow item queue at a step 78. A cash flow item queue includes an intermediate set of cash flow transactions that are used to carry out preliminary processing on related budget items. For example, the cash flow module creates temporary budgeted transactions from the budget items, then determines a particular account to which each budgeted transaction will be assigned, and merges related budgeted transaction together. At a step 80, the cash flow module uses the cash flow item queue to forecast the final cash flow. This step includes adjusting the budgeted transactions for any overlapping transactions. For example, if the cash flow forecast date range overlaps some completed past transactions, then those past completed transactions will be used instead of budgeted transactions. Similarly, if some actual transactions overlap with budgeted transactions, the cash flow module adjusts the budgeted transactions (i.e., reduces the budgeted transactions by the amount of overlapping actual transactions). The cash flow module will then generate and display a running balance for the selected account(s) at a step 82.

Figure 3:
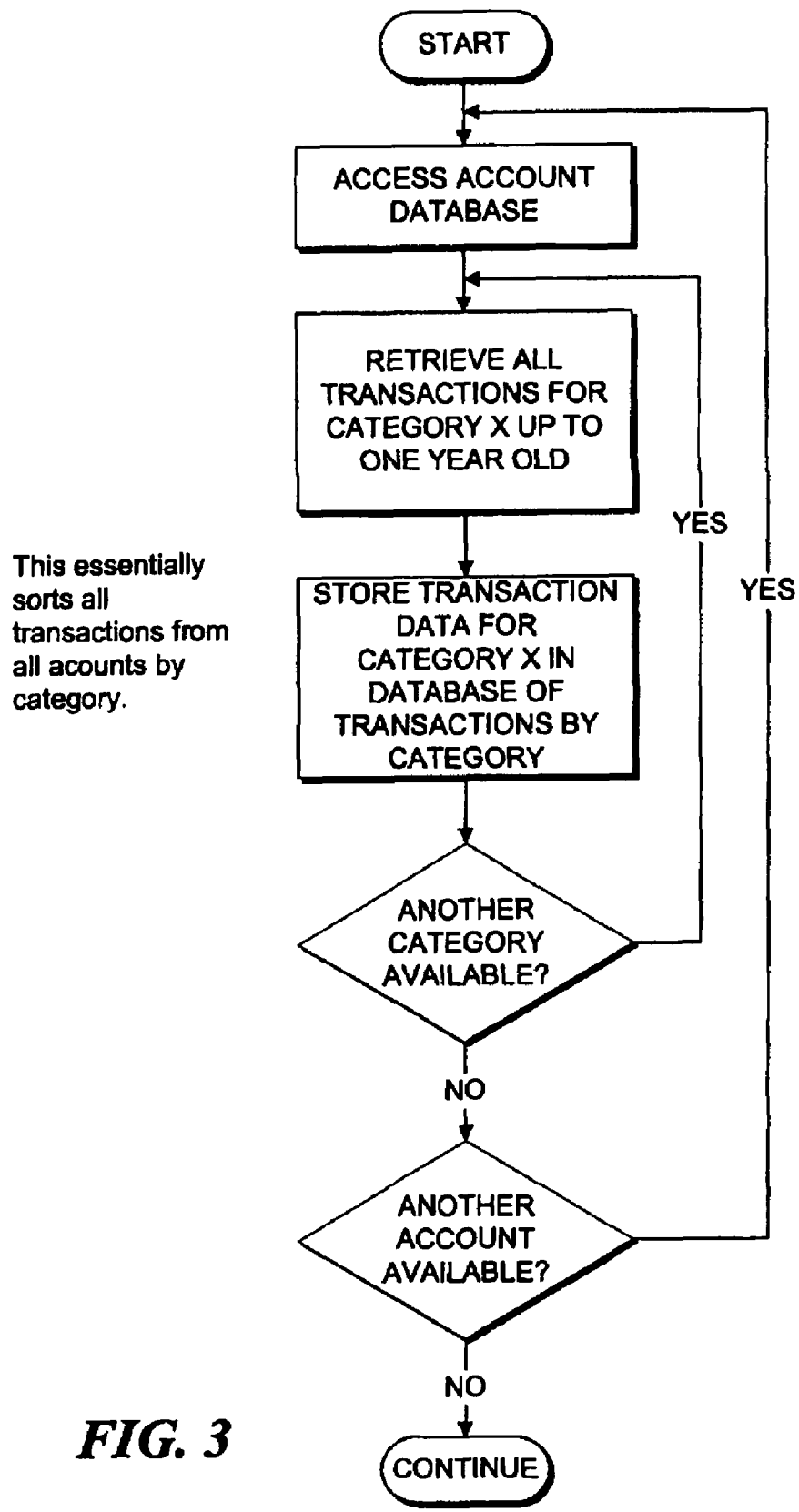
FIG. 3 illustrates the logic used to generate an autobudget by category.

FIG. 3 illustrates the logical steps used to generate an autobudget by category. The following description applies to each of steps 64a and 64b (in FIG. 2), as discussed above. At a step 100, an autobudget module accesses a database or databases that include data for all completed, scheduled, overdue, and post-dated transactions over a desired range of time and sorts the transactions by categories of financial information to generate a transactional list. The transactions may be associated with multiple accounts, which may be stored in a single database or in multiple databases.

Exemplary categories include: wage income, investment income, utility expenses, facility expenses, transportation expenses, etc. Categories may also be logically related to subcategories. For example, a category for transportation expenses may be logically related to subcategories for auto loan payment, fuel, auto insurance, maintenance, etc. Although logically related, subcategories of a parent category are each treated as if a separate category. Thus, transactions that are associated with a subcategory are grouped together and considered as an individual category separate from the parent category. Such grouping occurs at the lowest level of child category (e.g., at a sub-subcategory level). Transactions that are not assigned to a specific subcategory, but are associated with a parent category, are also grouped together and considered as an individual category separate from any subcategories. In effect, a parent category is treated as a separate catch-all category for any transactions that are not associated with a specific subcategory. Therefore, as used herein and in the claims that follow, the term "category" refers to any distinct level of grouped transactions.

Preferably, the range of time covering the transactions used in producing an autobudget is the most recent past twelve months. This range of time is different than the future budget date range and cash flow forecast date range indicated above. From among all the transactions of all accounts and all categories within the most recent past twelve months, the autobudget module notes the date of the earliest transaction (sometimes called the first transaction) and the date of the most recent transaction (sometimes called the last transaction). At a decision step 102, the autobudget module determines whether the range of time between the earliest transaction date and the most recent transaction date is greater than a specified period, such as one month. If there is insufficient transactional data covering at least the specified period, no autobudget items are created and a notice indicating that there are insufficient data is displayed to the user. Preferably, at least one month is required to provide a sampling of transactional data.

If, however, sufficient data exist, the autobudget module executes a loop to determine a budget item for each category of financial information. At a step 104, the autobudget module determines a number of values for a category based on the transactions in that category. The values include: the sum of transaction amounts for the category, the number of transactions for the category (sometimes called a transaction count), and the period of time spanned by the transactions for the category if more than one transaction is in the category. Preferably, the time period spanned by multiple transactions in the category is expressed as a number of months.

At a step 106, the autobudget module determines a budget item frequency for the category based on the transaction count for the category and the number of months spanned by the transactions of the category (if multiple transactions occurred in the category). At a step 108, the autobudget module determines a budget item amount for the category by scaling the sum of the transaction amounts to the budget item frequency. The steps above determine the amount and frequency of a budget item that will represent the category in the overall cash flow forecast.

At a decision step 110, the autobudget module compares the budget item amount for the category against a predefined threshold amount relevant to the currency of a desired country. The threshold amount represents a minimum budget item amount that would be considered useful in the desired country. For example, a minimum budget item amount might be $20.00. Any budget item amount that is not above the threshold amount is considered negligible and is deleted at a step 112.

At a decision step 114, the autobudget module determines whether any of the transactions assembled for the current category is defined as a scheduled transaction (i.e., as a recurring transaction). If a user has already defined a recurring transaction for the current category in any of the accessed accounts, the autobudget module ignores the estimated amount and frequency determined above and instead, substitutes the amount and frequency of the recurring transaction at a step 116. For example, if the user has entered a recurring transaction to pay the same amount on a house mortgage each month under the category of "mortgage payment," the autobudget module will refer to the amount and frequency defined by the recurring transaction for this category—even if the past completed transactions included a different amount or a different frequency of payments for this category. In the mortgage example, the user may have paid an additional amount in some of the past months, applied toward reducing the principal of the home mortgage loan. However, the user may not be certain that the additional amount can be paid every month, so the user has defined the recurring transaction amount to be only the minimum monthly mortgage payment. Correspondingly, the autobudget module refers to the amount and frequency defined by the recurring transaction to the budget item for the current category. If desired, the user may later modify the autobudget to include additional amounts or payments to produce a modified budget item. Alternatively, the user may later run "what-if" scenarios with the final cash flow forecast to see the result of additional amounts or payments.

Also, if multiple scheduled transactions are associated with the current category, the autobudget module will provide a budget item that refers to each scheduled transaction. This condition may occur if multiple scheduled transactions are defined for a category in a single account, or if a scheduled transaction is defined for the same category in different accounts.

It will be apparent that steps 114 and 116 may be performed prior to step 104, eliminating the need to estimate an amount and frequency for the current category. Effectively, an estimated amount and frequency is determined for those categories that contain only unscheduled transactions.

Once the budget item is established for the current category, at a decision step 118, the autobudget module determines whether another category is available in the transactional list, for use in deriving another budget item. If another category is available, the autobudget module returns to step 104 to begin the process for the new category. When all categories have been processed, a budget items queue is complete and available for a user to modify or for use in generating specific cash flow transactions that comprise the cash flow forecast.

Figure 4:
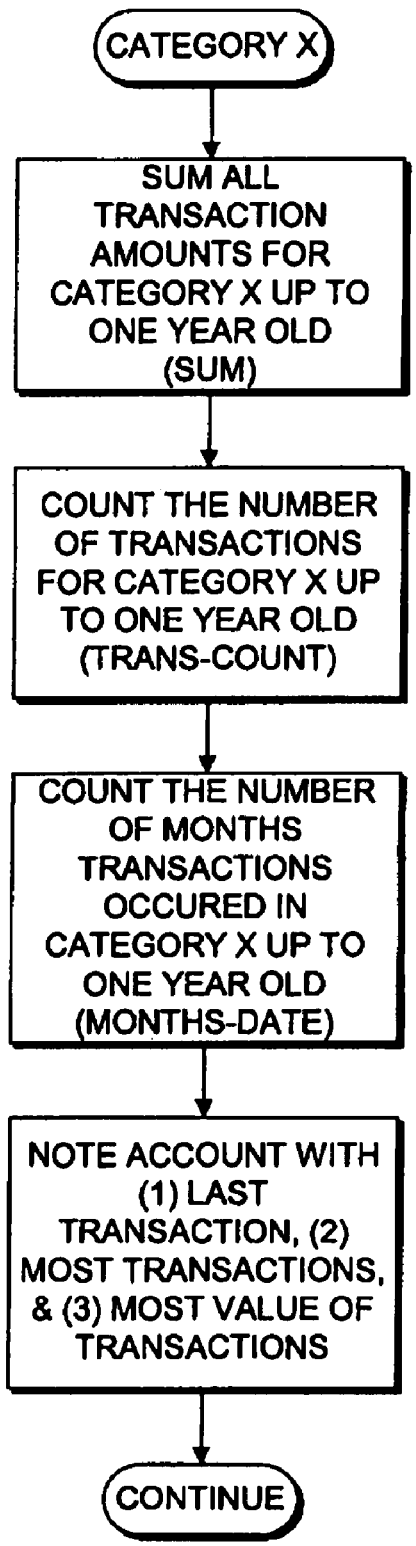
FIG. 4 illustrates the logic used to generate a transactional list sorted by category.

FIG. 4 illustrates the logical steps used to generate the transactional list (sometimes called the transactions queue), which is sorted by category. This Figure provides details of step 100, which is shown in FIG. 3. At a step 120 in FIG. 4, the autobudget module accesses a transactions database associated with an active account. As indicated above, there may be multiple accounts in which transactions occur. Thus, multiple databases may store transactions associated with each account or a single database may store transactions associated with each account. In any case, all transactions over the desired date range in each account are accessed by category to generate a new database of transactions sorted by category (i.e., to produce the transactional list or transactions queue). Specifically, at a step 122, the autobudget module copies all transactions within the most recent year for the current category from the transactions database associated with a current account. At a step 124, the autobudget module stores the copied transaction data for the current category in the corresponding category of the transactional list. At a decision step 126, the autobudget module determines whether another category is available for the current account. If so, the autobudget module returns to step 122 to copy the transactions for the new category.

Once all of the transactions from an account are copied and stored in the corresponding categories of the transactional list, at a decision step 128, the autobudget module determines whether another account is available. If so, the autobudget module returns to step 120 to sort the transactions by category for the next account. When all selected accounts have been processed, the transactional list is complete.

Figure 5:
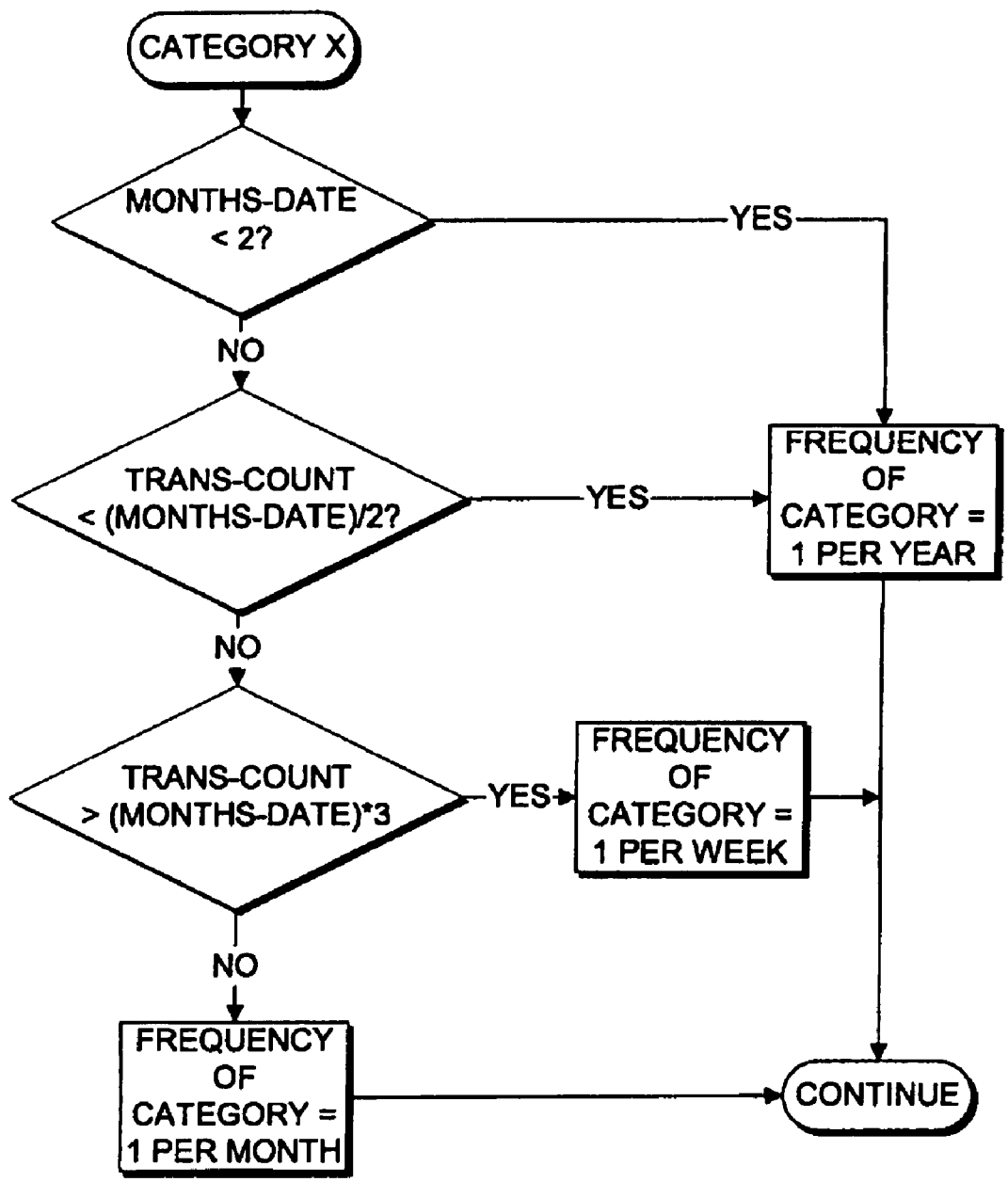
FIG. 5 illustrates the logic used to determine a number of values for each category.

FIG. 5 illustrates the logic used to determine a number of values for each category. This Figure provides details of step 104, as shown in FIG. 3. At a step 130 in FIG. 5, the autobudget module sums all transaction amounts for the current category from the transactional list. At a step 132, the number of transactions for the current category are counted, and the total number is stored as a transaction count.

The autobudget module then counts the number of periods spanned by the transactions of the current category at a step 134. As indicated above, the number of periods is preferably in terms of the number of months. However, the number of months spanned by multiple transactions in the category may be converted to the corresponding number of weeks, days, or some other unit of time, to match the units of time determined for the budget item frequency of the category discussed below. Also, if the category includes multiple transactions, the autobudget module notes the date of the earliest transaction in the category (sometimes called a category first transaction) and the most recent transaction in the category (sometimes called a category last transaction).

At a step 136, the autobudget module notes which account contains the most recent transaction for the category, the most number of transactions for the category, and the largest total value of transactions for the category. This information can be used later to determine which account the budget item will be assigned to, for the category.

Figure 6:
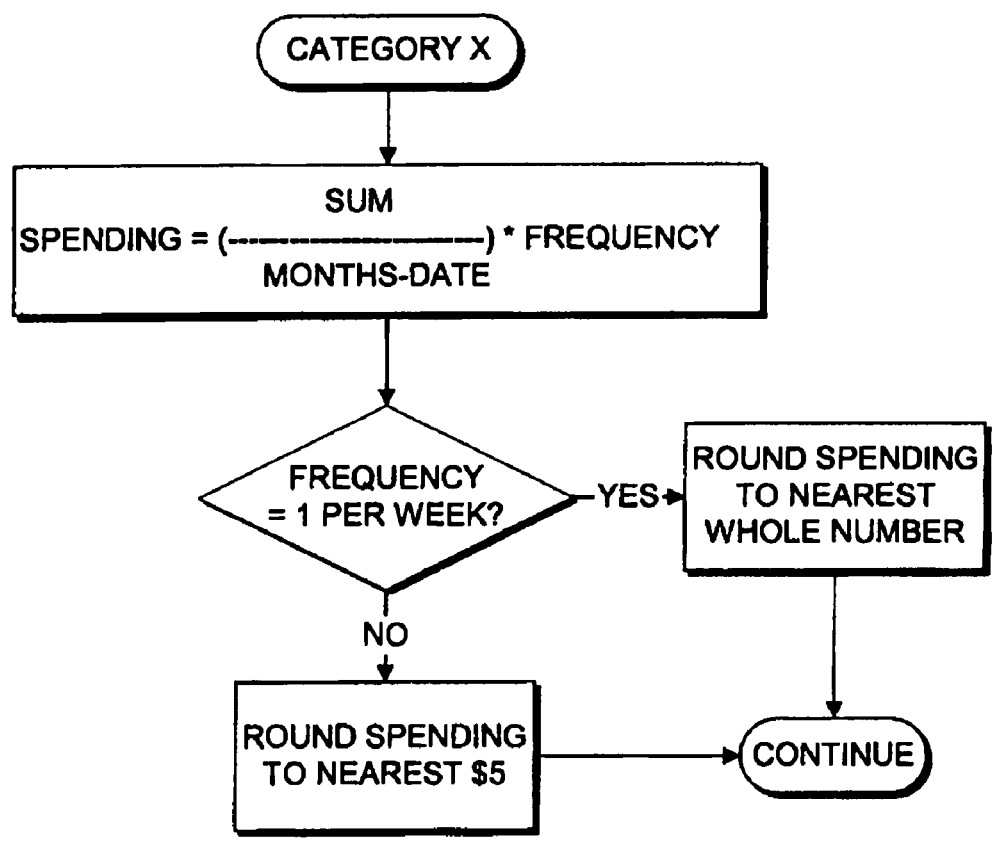
FIG. 6 illustrates the logic used to calculate a frequency of the trend transaction for a category.

FIG. 6 illustrates logic used to calculate a frequency of the budget item for a category. This figure provides details of step 106, which is shown in FIG. 3. At a decision step 140 of FIG. 6, the autobudget module determines whether there is only one transaction for the current category. If only one transaction occurred for the category, the autobudget module stores the specific date of the transaction at a step 141 and assigns the budget item frequency for the current category to "annually" at a step 142. Since there is only one transaction in the category, the dates spanned by the transaction is one day or zero months. Thus, the frequency may be equal to whatever duration is used to cover prior transactions, such as the most recent year.

As the name implies, an annual frequency means that the autobudget module will use one budget item per year to represent the category. If more than one transaction occurred, at a decision step 144, the autobudget module determines whether the total number of months spanning multiple transactions for the current category is less than two. If the span of transactions for the current category is less than two months, the autobudget module also sets the budget item frequency for the current category to "annually" at step 142. If the span is equal or greater than two months, at a decision step 146, the autobudget module determines whether the number of transactions for the category is less than half of the number of months spanned by the transactions for the category. For example, suppose that three transactions for a category occurred over ten months. Half of that period spanned would be five months. Since the transaction count is then less than one half of the date span (i.e., because three is less than five), the frequency of transactions is less than one transaction for every two months. Because the transactions occurred so infrequently, the autobudget module again sets the budget item frequency for the current category to "annually" at step 142. This step may be modified, or a similar step may be added to set the budget frequency to "semi-annually," "quarterly," or another frequency.

Conversely, if the transactions for the category occurred more frequently, the autobudget module determines at a decision step 148 whether the transactions can be considered monthly transactions or weekly transactions. If the number of transactions is greater than three times the number of months spanning the transactions, the transactions are occurring at least three times per month. In that case, the autobudget module sets the category budget item frequency to "weekly," or one budgeted transaction per week at a step 150. Otherwise, the autobudget module sets the category budget item frequency to "monthly," or one budgeted transaction per month at a step 152. Determining a frequency for the budgeted transaction(s) for each category is a key distinction over the prior art method of averaging to produce a budget.

Figure 7:
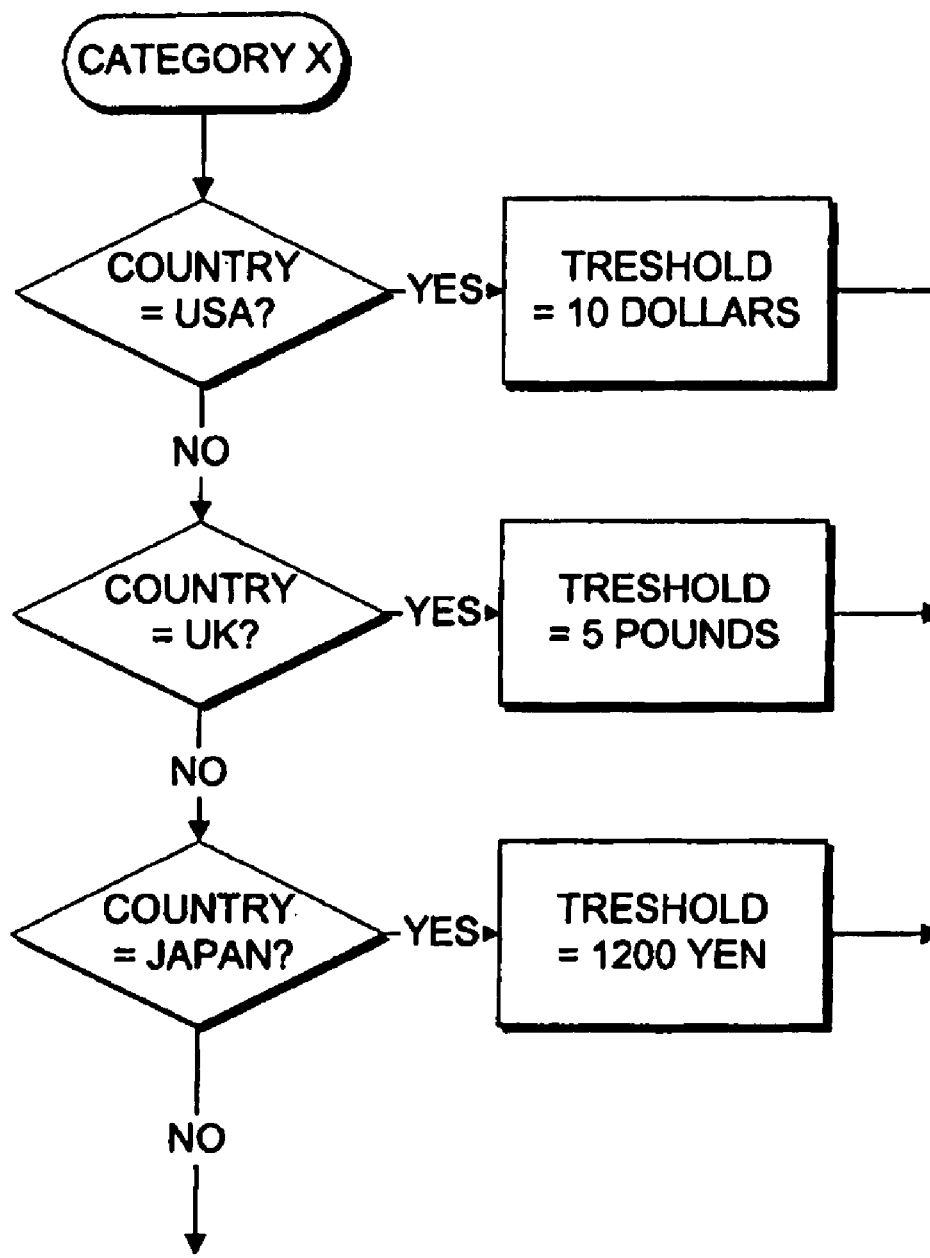
FIG. 7 illustrates the logic used to determine a trend transaction amount by scaling the sum of the actual transaction amounts to the trend transaction frequency for a current category.

FIG. 7 illustrates the logic used to determine a budget item amount by scaling the sum of the transaction amounts to the budget item frequency for the current category. This Figure provides details of step 108, which is shown in FIG. 3. At a decision step 160 of FIG. 7, the autobudget module determines whether one transactions for the current category occurred. If only one transaction occurred for the category, the sum is equal to the amount of that transaction, and at a step 162, the autobudget module assigns the amount of that single transaction as the budget item amount for the current category. Because the budget item has a frequency of "annually," the budget item for the category reflects an annual transaction at the same amount as the single transaction. In cases of multiple transactions in a category, which are discussed below, a date span for the category is determined from the first transaction of the category and the last transaction of the category. However, for a category with a single transaction, a date span cannot be determined based upon first and last transactions. Thus, the method described below for determining the amount for other annual budget items, cannot be used directly for a category with only a single transaction. An alternative would be to assume a date span of twelve months for a category with a single transaction. In any case, at a step 164, the autobudget module then rounds the budget item amount to the nearest predetermined incremental amount that is specified for the desired country (e.g., rounds to the nearest $5 for the USA).

If multiple transactions occurred in the current category, the autobudget module calculates a scaled budget item amount by multiplying the frequency of the budget item by an average of the transaction amounts over the time period spanned for the current category. Effectively, the total amount of the transactions for the category is averaged over the number of months spanned by the transactions, and scaled up or down as appropriate for the determined budget item frequency of the category. To begin, at a step 166, the autobudget module computes an average amount of the transactions over the time period spanned for the category by dividing the sum of the transaction amounts for the category by the number of months spanned by the transactions, yielding a monthly average. Those in the art will recognize that a quarterly, weekly, daily, or other average could be used as an alternative.

This average is then scaled by the budget item frequency. Specifically, at a decision step 168, the autobudget module determines whether the budget item frequency for the current category was determined to be "annually." If so, the autobudget module multiplies the computed monthly average by twelve, at a step 170, to produce an annual budget item amount. The autobudget module again rounds the resulting budget item amount at step 164. Note that the annual budget item amount may be different than the sum of the transaction amounts for the category, even though the transactional list was generated from completed transactions over the most recent entire year. For example, suppose that the sum of the completed transactions for the category totaled $500. Further, suppose that only two completed transactions for the category occurred and that they were spaced ten months apart, i.e., the time between the category first transaction and the category last transaction was ten months. The autobudget module would determine the budget item frequency to be "annually," i.e., one budgeted transaction per year and would also calculate the average amount of the completed transactions over the period spanned by the two transactions to be $500/10 months, or $50 per month. However, since the budget item frequency was determined to be once per year, or once every 12 months, the budget item amount would be scaled up by 12 to $600 over a 12 month period ($50×12=$600). Thus, the budget item amount would be $600 at a frequency of one transaction per year, even though the sum of the completed transactions over the most recent year was only $500.

If the budget item frequency is not "annually," at a decision step 172, the autobudget module determines whether the budget item frequency for the category is "monthly." If the budget item frequency for the category is "monthly," the autobudget module sets the budget item amount to the computed monthly average at a step 174. The autobudget module again rounds the resulting budget item amount at step 164.

If the response to decision step 172 is negative, the autobudget module determines at a decision step 176 whether the budget item frequency is "weekly," and if so, multiplies the computed monthly average by one fourth (0.25) at a step 178, to produce a weekly budget item amount. In that case, the autobudget module rounds the weekly budget item amount to the nearest whole number at a step 180. If the budget item frequency is not recognized, the autobudget module processes an error at a step 182.

Figure 8:
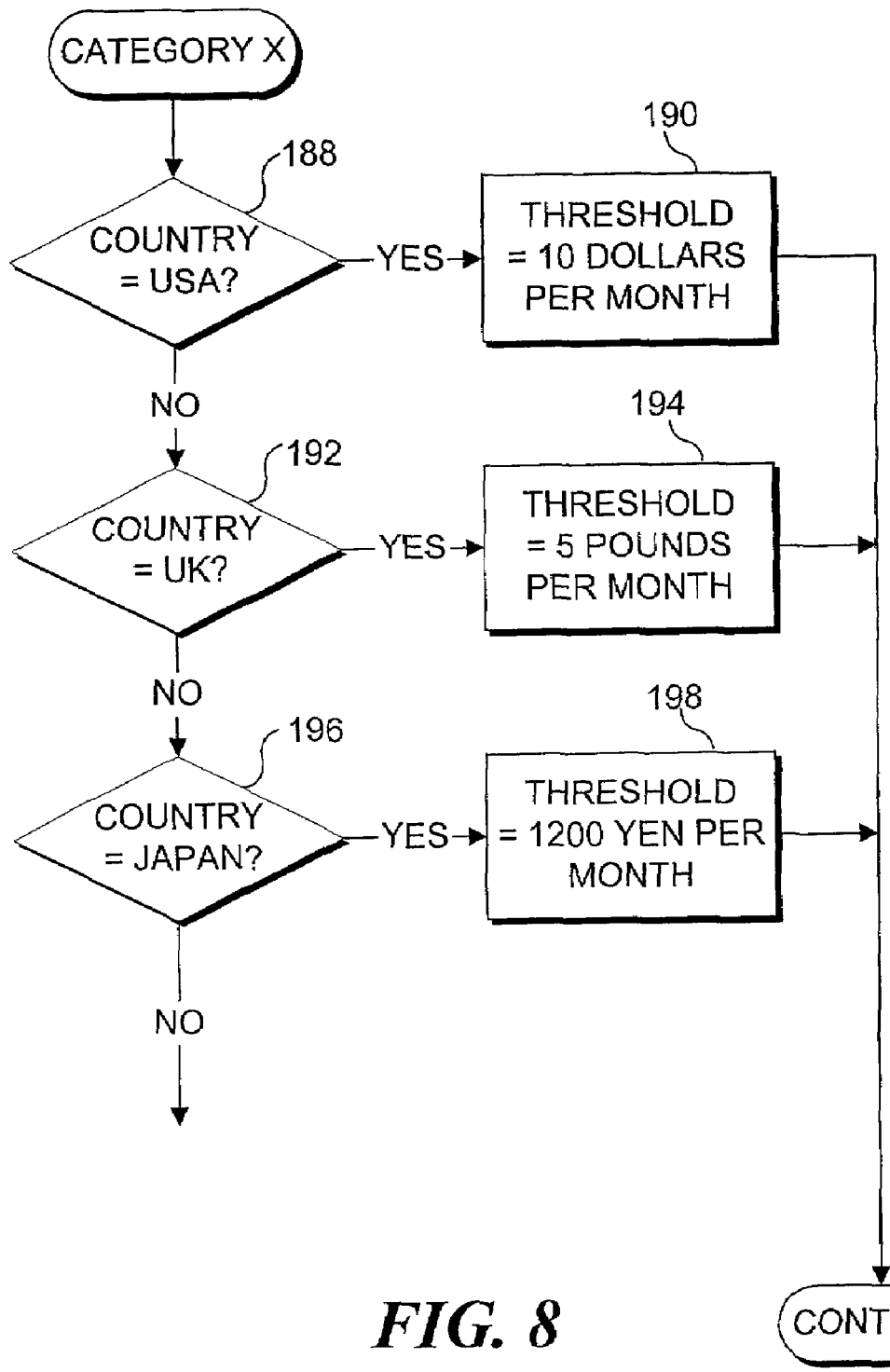
FIG. 8 illustrates the logic used to define the minimum threshold value for a desired country.

FIG. 8 illustrates logic used to define the minimum threshold value for a desired country. This figure provides details of step 110, as shown in FIG. 3. FIG. 8 illustrates the logical steps used for making a determination of which country from among a plurality of countries has been selected by the user for implementing the present invention. At a decision step 188, the autobudget module determines whether the desired country is the United States. If so, the minimum threshold value is set to ten dollars per month at a step 190. If the desired country is not the United States, the autobudget module determines at a decision step 192 whether the desired country is the United Kingdom. If so, the autobudget module sets the minimum threshold value to five pounds per month at a step 194. Similarly, at a decision step 196, if the desired country is Japan, the autobudget module sets the minimum threshold value to 1200 yen per month at a step 198. The process continues until the desired country is identified from among the plurality of countries and the minimum threshold value for the selected country is set. The minimum threshold value may be scaled to match the budget item frequency for the category before it is compared to the budget item amount to determine whether the budget item amount is negligible for the desired country. It should be noted that the threshold values illustrated are exemplary and it will be understood that other values can instead be used.

Figure 9:
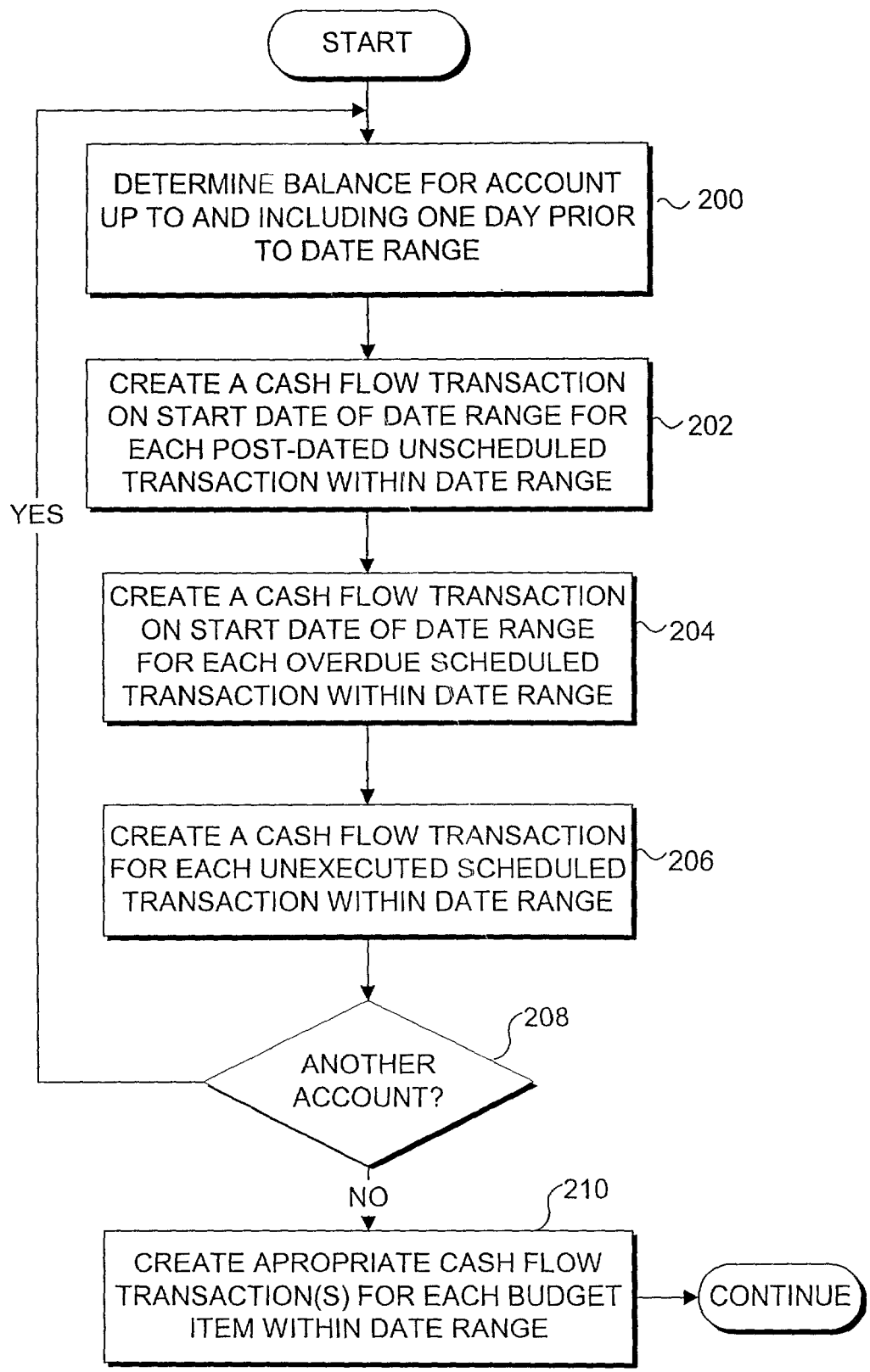
FIG. 9 illustrates the logic used to create a cash flow item queue containing representative cash flow transactions.

FIG. 9 illustrates logic used to create a cash flow item queue containing representative cash flow transactions. This figure provides details of step 78 shown in FIG. 2. At a step 200 of FIG. 9, the cash flow module determines a balance for each selected account up to and including the date one day prior to the beginning of the desired date range of the cash flow forecast. At a step 202, the cash flow module creates a cash flow transaction on the start date of the cash flow forecast date range for each postdated unscheduled transaction within the date range. This step ensures that any postdated transactions that have not been completed before the start date of the cash flow forecast date range will be accounted for in the final cash flow forecast. Similarly, at a step 204, the cash flow module creates a cash flow transaction on the start date of the date range for each overdue scheduled transaction that falls within the date range. At a step 206, the cash flow module then creates a cash flow transaction for each unexecuted scheduled transaction within the date range. For example, the cash flow module will create a cash flow transaction for each instance of a scheduled bill payment transaction that a user has entered.

At a decision step 208, the cash flow module determines whether an additional account was selected for the cash flow forecast. If another account was selected to be included in the cash flow forecast, the cash flow module returns to step 200 to create corresponding cash flow transactions for the next account. Those skilled in the art will recognize that the looping structure may be altered in a number of ways, such as looping after each of steps 202, 204, or 206.

Once all selected accounts are processed, the cash flow module creates appropriate cash flow transactions for each budget item within the desired date range at a step 210. This step is described in further detail below. Note that if an existing budget is used for the cash flow forecast, the accounts selected for the cash flow forecast may differ from the accounts previously used to generate the initial autobudget that forms the basis of the existing budget. Although budget items are associated with categories and not accounts, and the autobudget process utilizes all available accounts when creating the autobudget, a modified budget may not reflect information derived from an account added after an autobudget was initially created. Therefore, if a user selects an account to be included in the cash flow forecast, yet that account was not considered during the initial creation of the existing budget, the cash flow module may not have any budget information related to every account. Nevertheless, the cash flow module will utilize post-dated, overdue, and scheduled transactions of each selected account.

Figure 10:
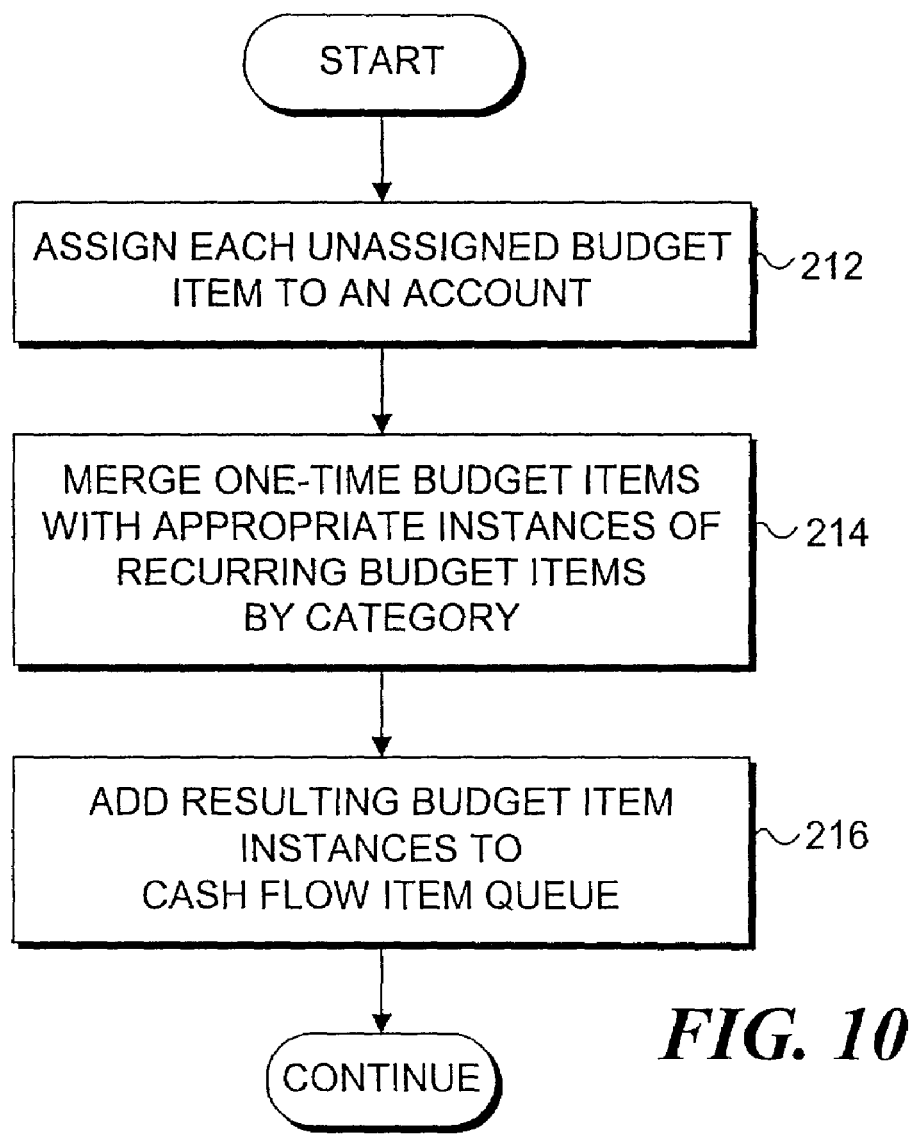
FIG. 10 illustrates the logic used to create appropriate cash flow transactions for each budget item within the desired cash flow forecast date range.

FIG. 10 illustrates logic used to create appropriate cash flow transactions for each budget item within the desired cash flow forecast date range. This Figure provides an overall process of step 210 shown in FIG. 9. At a step 212 of FIG. 10, the cash flow module assigns each unassigned budget item to an account. Because the budget may include budget items corresponding to scheduled transactions (e.g., scheduled/recurring bills), some of the budget items may already be associated with an account. This condition may be true if a budget item simply points to the information defining the underlying scheduled transaction.

Once all budget items are assigned to an account, the cash flow module merges one-time budget items with appropriate instances of recurring budget items on a category by category basis, at a step 214. Such merging may also be done based on other common characteristics, such as the same payee, if known. To accomplish such merging, temporary instances of the budget items are created and stored in a temporary queue. Once the merging is complete, the cash flow module adds the resulting budget item instances to the cash flow item queue at a step 216.

Figure 11:
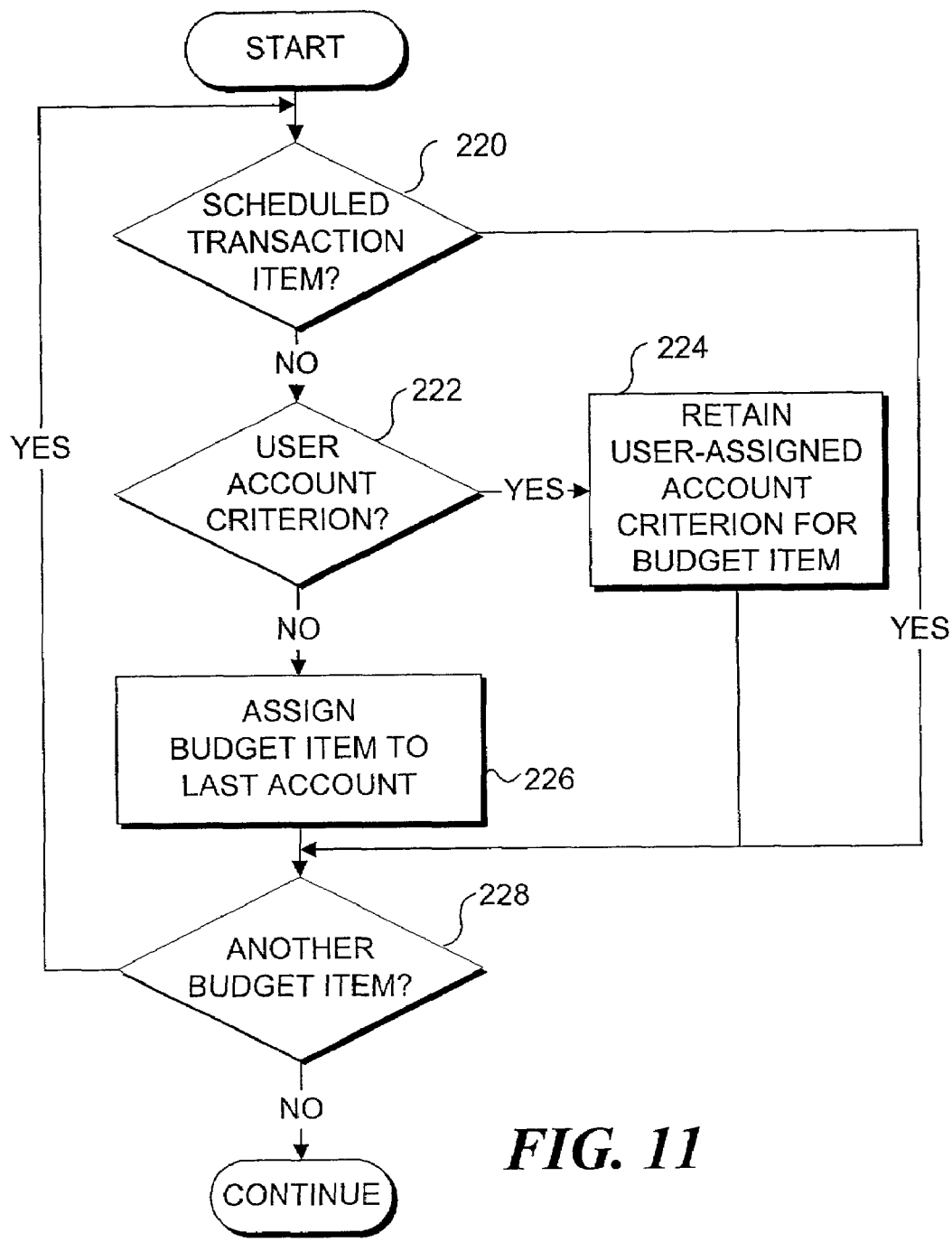
FIG. 11 illustrates the logic used to assign budget items to an account.

FIG. 11 illustrates logic used to assign budget items to an account. This Figure provides details of step 212, as shown in FIG. 10. At a decision step 220, the cash flow module determines whether the current budget item is based on a scheduled transaction item. Because scheduled transactions are already associated with an account, the corresponding budget item retains the same account association and skips to the end of this process.

If, however, a budget item is not already associated with an account, the cash flow module determines, at a decision step 222, whether the user previously specified an account criterion. Through an options dialogue, a user may have previously chosen a particular account to be designated for an individual category of budget items. Alternatively, a user may have established a broader criterion. For example, the user may have established that budget items in a specific category be assigned to the account used most often for that category (e.g., the largest transaction count). Other options include assigning the account that had the largest total value of transactions for the category. If a criterion is already established by the user, the cash flow module retains that criterion for the current budget item at a step 224. Otherwise, at a step 226, the cash flow module defaults to assigning the budget item to the last account used for the category associated with the budget item. At a decision step 228, the cash flow module determines whether another budget item is available, and if so, loops back to decision step 220. Once all budget items are assigned to an account, the cash flow module continues with the merging process.

Figure 12:
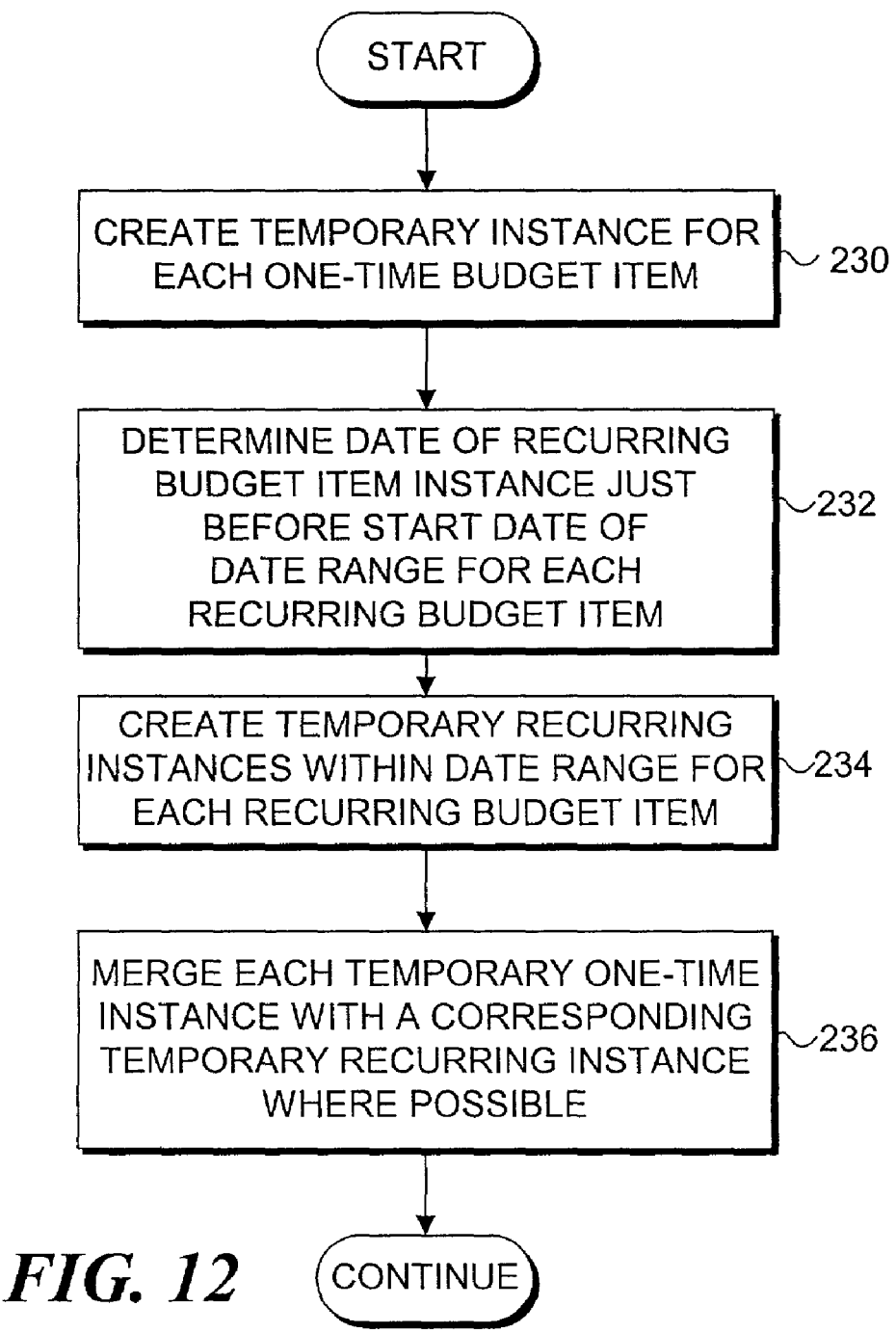
FIG. 12 illustrates the logic used to merge one-time budget items with appropriate instances of recurring budget items, on a category by category basis.

FIG. 12 illustrates logic used to merge one-time budget items with appropriate instances of recurring budget items, on a category by category basis. This figure provides details of step 214, as shown in FIG. 10. At a step 230, the cash flow module creates a temporary instance for each one-time budget item in a temporary queue. The cash flow module then processes recurring budget items. Those skilled in the art will recognize that creating temporary instances of one-time budget items and recurring budget items may be combined in a single loop. For each recurring budget item, at a step 232, the cash flow module determines the date of the particular instance that falls just before the start date of the desired cash flow forecast date range. To determine this date, the cash flow module starts from January 1 of the year containing the start date of the cash flow forecast date range. The cash flow module then iterates by the frequency of the recurring budget item until reaching the date of the recurring budget item instance that falls just before the start date of the cash flow forecast date range. At a step 234, the cash flow module then creates temporary recurring instances covering the date range in the temporary queue, for the recurring budget item.

Once temporary instances are created for all of the one-time budget items and all of the recurring budget items, the cash flow module merges each temporary one-time instance with a corresponding temporary recurring instance, where possible, at a step 236. This process may require sorting the instances by category or performing multiple loops to correlate temporary one-time instances with temporary recurring instances by category. In any case, for each temporary one-time instance that falls within the frequency span of a temporary recurring instance in the same category, the temporary one-time and temporary recurring instance are merged together. As indicated above, once the merging process is complete. the resulting budget item instances are added to the cash flow item queue.

Figure 13:
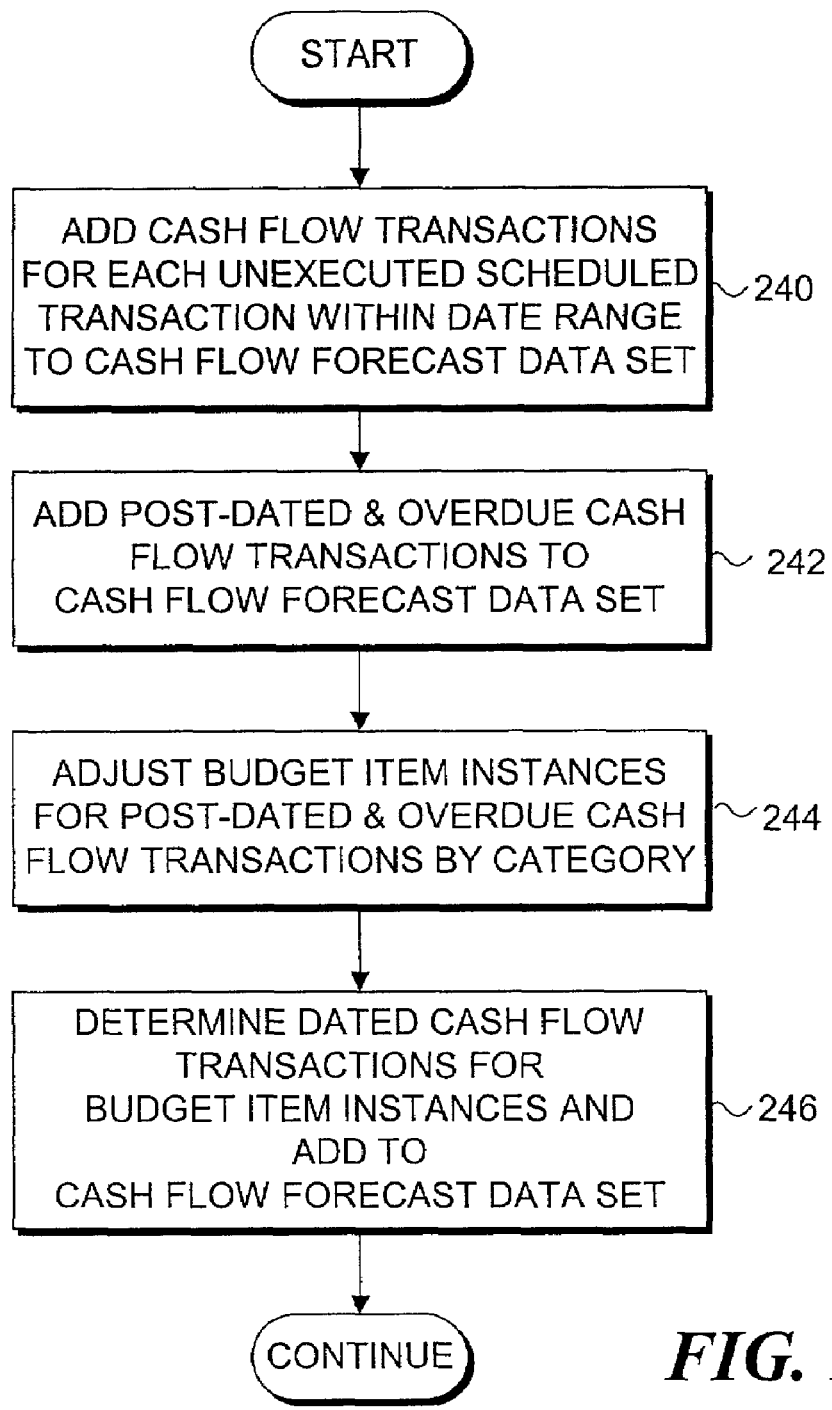
FIG. 13 illustrates the logic used to develop a final cash flow forecast.

FIG. 13 illustrates logic used to develop a final cash flow forecast. This Figure provides details of the overall logic of step 80, which is shown in FIG. 2. At a step 240 of FIG. 13, the cash flow module begins entering cash flow transactions into a cash flow forecast data set. The cash flow module enters the cash flow transactions created for each unexecuted scheduled transaction within the cash flow forecast date range. For example, the cash flow module enters the cash flow transactions that were created for each scheduled bill. Similarly, at a step 242, the cash flow module enters each post-dated and overdue cash flow transaction that was created as described above.

At a step 244, the cash flow module then uses the information about the post-dated and overdue cash flow transactions to adjust the budget items instances that cover the same time period as the post-dated and overdue cash flow transactions (e.g., the budget item instances that cover the start date of the cash flow forecast date range). On a category by category basis, the cash flow module increases or reduces the budget amount of the budget item instances that overlap with post-dated and overdue cash flow transactions, thereby ensuring that the overlapping budget item instances accurately reflect post-dated and overdue cash flow transactions within the same time frame for each category.

Once all of the appropriate budget item instances are adjusted, the cash flow module creates specifically dated cash flow transactions for all of the budget item instances, at a step 246. Correspondingly, as indicated above, the specifically dated cash flow transactions representing the budget item instances are added to the cash flow forecast data set.

Figure 14:
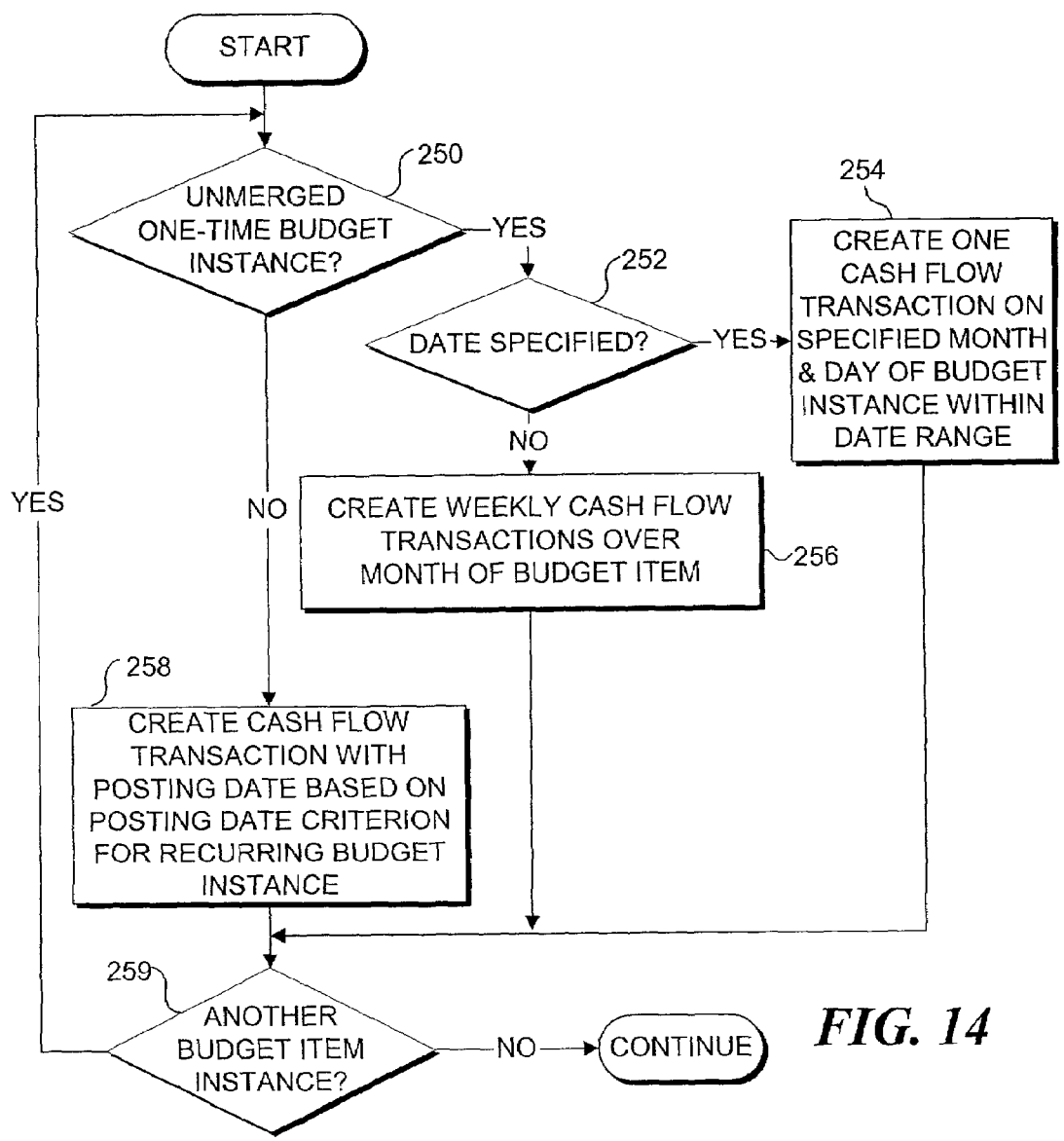
FIG. 14 illustrates the logic used to create dated cash flow transactions for budget item instances.

FIG. 14 illustrates the logic used to create dated cash flow transactions for budget item instances. This Figure provides details of step 246, which is shown in FIG. 13. At a decision step 250, the cash flow module determines whether a budget item instance is an unmerged one-time budget item instance. A budget item instance may be an unmerged one-time budget item instance if the instance is the only budget instance in a category. If the budget item instance is a one-time budget instance, the cash flow module determines at a decision step 252 whether a specific date was associated with the instance. If so, the cash flow module creates a single cash flow transaction on the same day and month of the instance within the cash flow forecast date range. Otherwise, at least the month will be known from the underlying one-time budget item. In that case, at a step 256, the cash flow module will create four weekly cash flow transactions over the month of the budget item. Effectively, this step averages the amount of the one-time budget instance over four weekly cash flow transactions.

If the current budget item instance is not a one-time budget instance, the budget item instance must be a recurring budget item instance. If so, the cash flow module creates a cash flow transaction at a step 258, with a posting date that is based on a posting date criterion. Like the account assignment criterion, the posting date criterion may be designated by the user, or a default posting date criterion will be used. Further detail of this step is provided below. At a decision step 259, the cash flow module determines whether another budget item instance remains to be processed. If so, the cash flow module returns to decision step 250. Once all budget item instances are processed, the cash flow forecast data set is complete and can be used to generate a running balance for the cash flow forecast, as shown at step 82 in FIG. 2.

Figure 15:
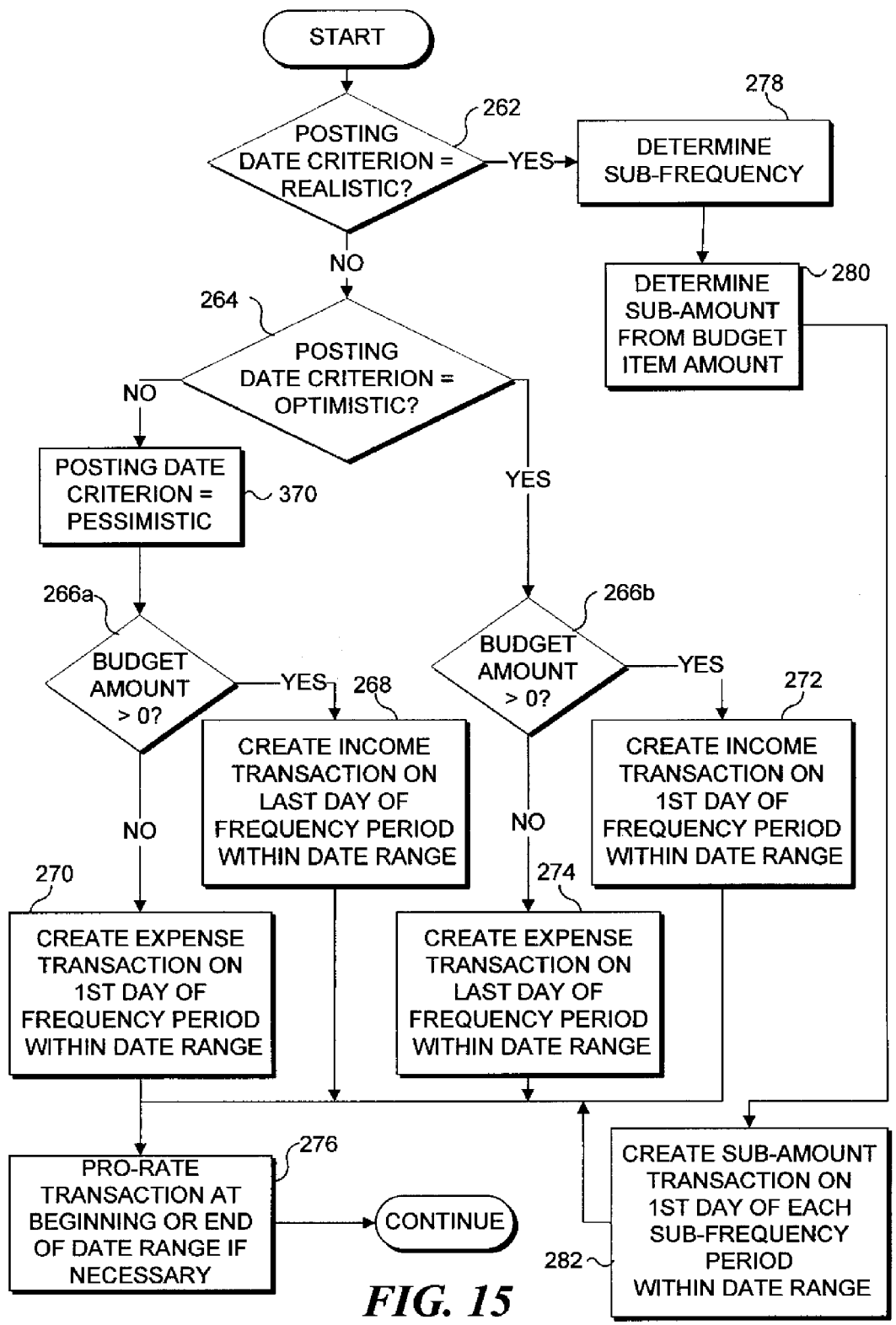
FIG. 15 illustrates the logic used to create cash flow transactions with specific posting dates for recurring budget item instances.

FIG. 15 illustrates the logic used to create cash flow transactions with specific posting dates for recurring budget item instances. This Figure provides details of step 258, as shown in FIG. 14. At a decision step 262 of FIG. 15, the cash flow module determines whether the posting date criterion is defined as "realistic." The term "Realistic" is relative to alternative criterion, which are "Pessimistic" and "Optimistic." For example, a pessimistic posting date indicates that an expense cash flow transaction should be dated as early as possible in a frequency period. Conversely, an expense cash flow transaction with an optimistic posting date should be dated as late as possible in a frequency period.

If the posting date criterion for the budget instance is not defined as Realistic, at a decision step 264, the cash flow module determines whether the posting date criterion is defined as optimistic. If not, the posting date criterion must be pessimistic as shown in a decision step 370. The cash flow object then determines at a decision step 266a whether the budget instance represents an income instance or an expense instance. If the budget amount of the instance is greater than zero, the instance is an income, and at a step 268, the cash flow module creates an income cash flow transaction on the last day of the frequency period for the instance. If the last day of the frequency period for that instance falls outside the cash flow forecast date range, that cash flow transaction is discarded. Conversely, if the budget instance is an expense instance, at a step 270, the cash flow module creates an expense cash flow transaction on the first day of the frequency period of the budget instance within the cash flow forecast date range. If the first day of the frequency period falls before the start date of the cash flow forecast date range, the cash flow module assigns the posting date as the start date of the cash flow forecast date range and prorates the amount of the cash flow transaction as described below.

Similarly, if the posting date criterion for the budget instance is optimistic, the cash flow module determines at a step 266b, whether the budget instance is an income or expense instance. If the budget instance is an income instance, the cash flow module creates an income cash flow transaction on the first day of the frequency period of the budget instance, at a step 272. Conversely, if the budget instance is an expense instance, the cash flow module creates an expense cash flow transaction on the last day of the budget instance frequency period, at a step 274.

Alternatively, if the posting date criterion for the budget instance is Realistic, a moderate posting date (or dates) is assigned between the beginning and ending of a frequency period. A realistic posting date may simply be a posting date in the middle of a frequency period. Preferably, however, a realistic posting date will result in a number of cash flow transactions spread over the frequency period. Thus, at a step 278, the cash flow module determines a sub-frequency. Through an option dialog, the user preferably has the option to choose a sub-frequency as monthly, weekly, or daily. An alternative is to determine the sub-frequency from the frequency associated with the recurring budget instance. For example, if the frequency associated with the budget instance is "annually," the cash flow module could alternatively determine a sub-frequency of "quarterly." Other sub-frequencies may be used in the alternative, such as semi-annually, bi-monthly, etc. Similarly, at a step 280, the cash flow module determines a sub-amount from the budget instance amount, based on the sub-frequency. At a step 282, the cash flow module then creates a cash flow transaction on the first day of each sub-frequency period for the cash flow instance.

In some cases, the cash flow forecast date range may not include the entire frequency period, or sub-frequency period, of a recurring budget instance. Thus, a corresponding cash flow transaction may not represent the entire frequency period, or sub-frequency period. This condition may occur for the first or last recurring cash flow transaction of a category, or for the first or last cash flow transaction based on a sub-frequency. Thus, at a step 276, the cash flow module determines whether the frequency period, or sub-frequency period extends beyond the start date or end date of the cash flow date range, and if so, prorates the amount of the corresponding cash flow transaction. As indicated above, once all budget item instances are processed, the cash flow forecast data set is complete and can be used to generate a running balance for the cash flow forecast, as shown at step 82 in FIG. 2.

Figure 16:
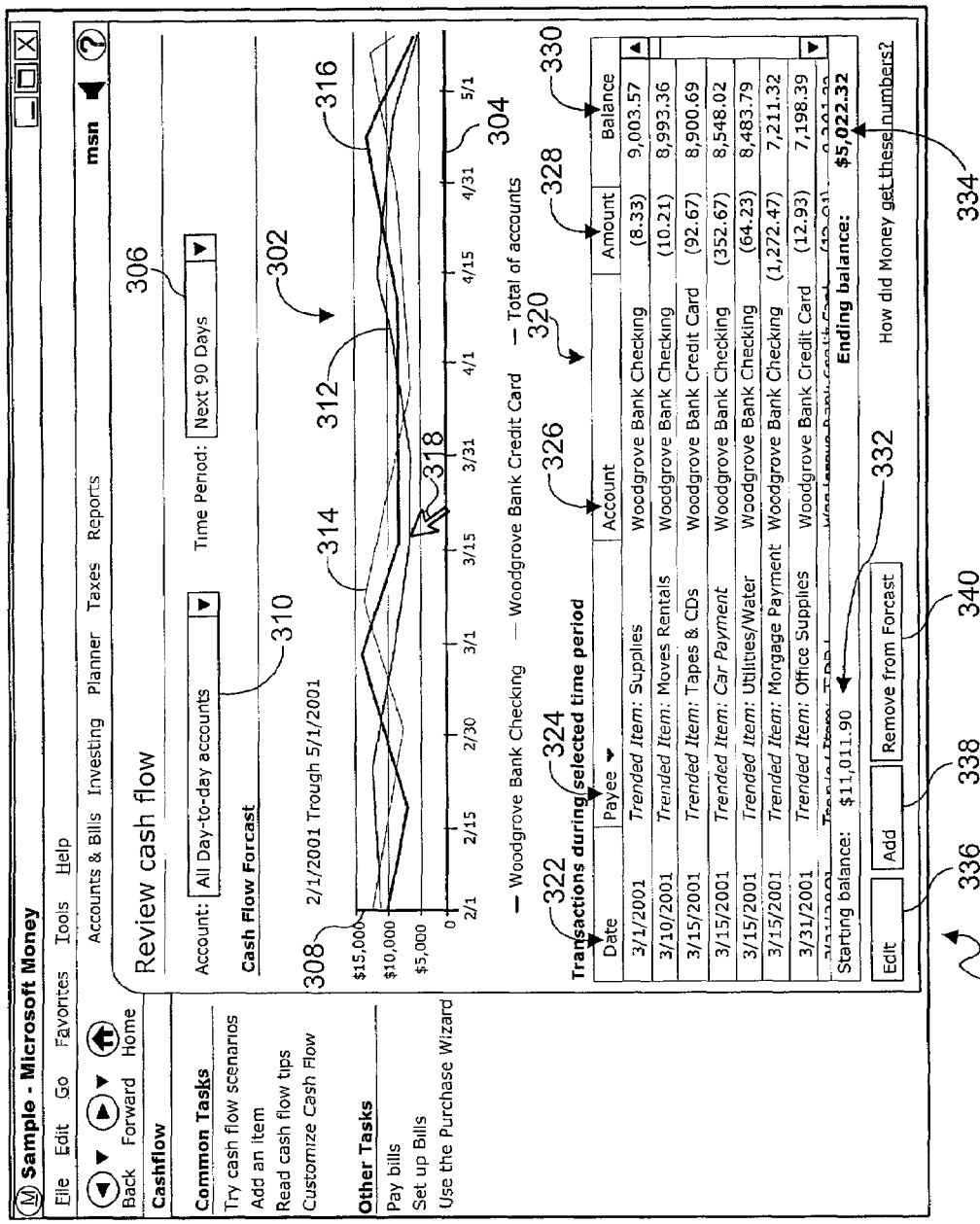
FIG. 16 illustrates an exemplary graphical user interface (GUI) for displaying and manipulating a cash flow forecast.

FIG. 16 illustrates an exemplary graphical user interface (GUI) 300 for displaying and manipulating a cash flow forecast. GUI 300 enables a user to obtain a graphical display 302 of a cash flow forecast. The graphical display may be a line graph with a time axis 304 that may selectively display a number of different forecast periods as chosen by a user through a time period box 306. Such a graph also includes a balance axis 308 that automatically scales to the largest and smallest running balance values of a cash flow forecast or forecasts. Through an account box 310, a user may select an option to display a cash flow forecast for an individual account or a combination of accounts. Those skilled in the art will recognize that other types of graphs may be used, such as bar charts, a shaded area chart divided by a demarcation line, etc.

To provide a display of a cash flow forecast, the cash flow module first obtains an account balance at a beginning of the selected forecast period. Typically, such a beginning account balance is the current actual account balance. However, the beginning date of the selected forecast period may be set to another date in the past or future. If the beginning date is set to a date in the past, the cash flow module uses the actual transactions to that beginning date to derive the beginning balance. From the beginning balance, the cash flow module then generates a running balance of the account, based on the cash flow transactions assigned to the selected account, or accounts. All categories of cash flow transactions assigned to the selected account are included in the running balance. Thus, categories of income transactions are added to the running balance and categories of expense transactions are subtracted from the running balance. The running balance extends to an end of the selected forecast period. This running balance is the cash flow forecast for the account.

The cash flow module may also generate a total cash flow forecast for multiple accounts by including the cash flow transactions assigned to the multiple accounts in a total running balance. For example, a total line 312 represents such a cash flow forecast of all accounts. Total line 312 is a composite of a credit card account line 314 and checking account line 316. As suggested by their names, credit card account line 314 represents the cash flow forecast of cash flow transactions assigned to a credit card account, and checking account line 316 represents the cash flow forecast of cash flow transactions assigned to a checking account.

GUI 300 also enables a user to display a list of the individual transactions by selecting a point on a line with a cursor 318. Selecting a point on a line adjusts the display of a transaction list 320 to those cash flow transactions closest in time to the date corresponding to the point selected. As illustrated, a user has selected a point on total line 312 near the date Mar. 15, 2001. Correspondingly, transaction list 320 displays the cash flow transactions centered around that date. Transaction list 320 includes columns of parameters associated with each cash flow transaction, including a date parameter 322, a payee parameter 324, an account parameter 326, an amount parameter 328, and a balance parameter 330. Amount parameter 328 provides the amount of each individual transaction, whereas balance parameter 330 provides the running balance of the selected account(s) as a result of each individual cash flow transaction.

Also displayed are a beginning balance 332 and an ending balance 334. These balances correspond to the beginning and ending balances of the entire cash flow forecast date range selected, not just the beginning and ending balances of the individual transactions displayed in the transaction list.

GUI 300 also enables a user to modify the list of individual transactions, which subsequently causes the cash flow module to update the cash flow forecast(s). For example, a user may select an individual cash flow transaction in the transaction list and select edit button 336 to modify parameters of the selected individual transaction. A user may make a one-time modification to a single occurrence of the individual transaction, such as a one-time change to the date or amount of the transaction. Alternatively, a user may make a modification to a series of transactions associated with the selected transaction, such as a change to the amount of all recurring transactions associated with the selected transaction. Similarly, a user may insert a new one-time cash flow transaction or new recurring cash flow transaction by selecting add button 338. Conversely, a user may delete a one-time transaction or recurring transaction by selecting remove from forecast button 340. Such changes are stored in the cash flow transaction data set. Graphical display 302 and transaction list 320 are also automatically updated after any change.

Figure 17:
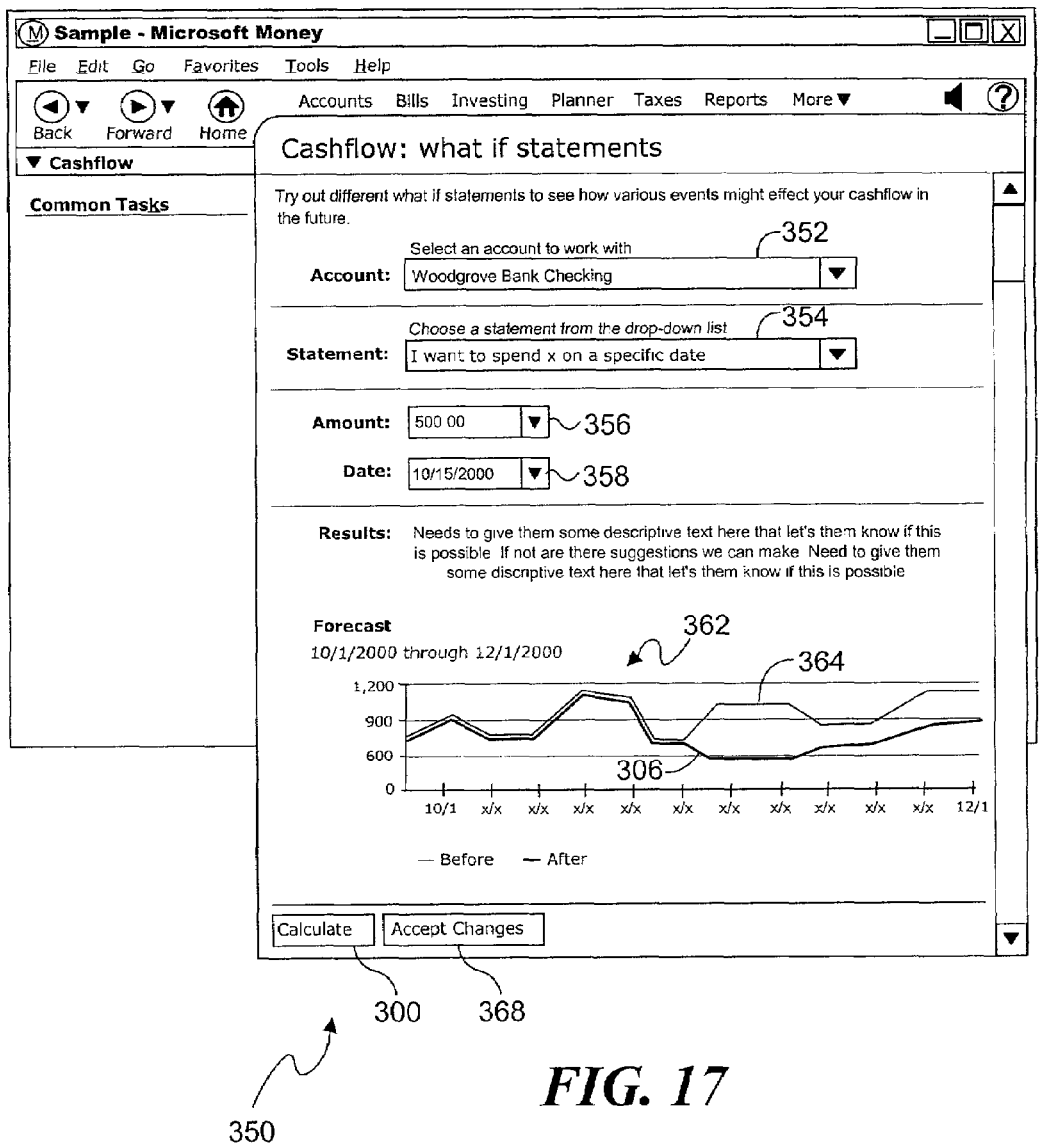
FIG. 17 illustrates an exemplary What-If GUI that enables a user to compare the affect of a new transaction to an original cash flow forecast.

Although the updated display resulting from a change helps a user to see the affect of the change, it is also useful to compare the affect of the change to the original cash flow forecast. FIG. 17 illustrates a What-If GUI 350 that enables a user to compare the affect of a new cash flow transaction to the original cash flow forecast. A user may modify a number of parameters of the new transaction in the cash flow forecast. An account box 352 enables a user to select an account from which to compare the original and new cash flow forecasts. A statement box 354 enables a user to select a scenario under which to generate the new cash flow forecast for the selected account. As above, scenarios include adding a one-time cash flow transaction or adding a recurring cash flow transaction. An amount box 356 and a date box 358 enable a user to select or enter an amount and date of the new transaction, respectively.

Once all the parameters are established, a user may select a calculate button 360 to generate the cash flow forecasts. As above, the original cash flow forecast is computed as a running balance based on the original cash flow transactions in the original cash flow forecast data set. However, a new cash flow forecast is computed as a running balance based on the original cash flow transactions, but including any new transaction(s) or omitting any deleted transactions. The new cash flow forecast is stored in a new data set. What-If GUI 350 then displays a graph 362 showing both an original cash flow forecast line 364 and a new cash flow forecast line 366. After comparing the two forecast lines, a user may update the cash flow transaction data set with the new transaction by selecting an accept changes button 368.

Although the present invention has been described in connection with a preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A computer-implemented method for estimating a budget item based upon at least one prior transaction, for use in predicting a cash flow forecast, comprising the steps of:
   (a) summing all prior transactions occurring over a specified range of time to produce a sum;
   (b) determining, utilizing an autobudget module executing on the computer, a total number of prior transactions occurring during said specified range of time;
   (c) determining, utilizing the autobudget module executing on the computer, a date span between a first transaction and a last transaction within the specified range of time;
   (d) determining, utilizing the autobudget module executing on the computer, a budget item frequency as a function of the total number of prior transactions, and the date span, wherein determining the budget item frequency comprises assigning the budget item frequency to be weekly if the total number of prior transactions is not equal to one, the date span is equal to or greater than two months, the total number of prior transactions is equal to or greater than one half of the date span expressed in months, and the total number of prior transactions is greater than a predefined multiple of the date span expressed in months;
   (e) determining, utilizing the autobudget module executing on the computer, an average amount for the prior transactions occurring over the date span;
   (f) determining, utilizing the autobudget module executing on the computer, a budget item amount by scaling the average amount for the prior transactions occurring over the date span, by the budget item frequency; and
   (g) using the budget item amount and the budget item frequency for predicting the cash flow forecast, wherein the cash flow forecast comprises a daily forecast of transactions over a forecast period comprising at least a future time period, thereby facilitating the understanding of income and spending patterns and the recognition of opportunities to improve a financial situation.

2. The method of claim 1, wherein the step of determining the budget item frequency further comprises the steps of:
   (a) assigning the budget item frequency to be annually if one of the following is true:
      (i) the total number of prior transactions is equal to one;
      (ii) the total number of prior transactions is not equal to one, and the date span is less than two months; and
      (iii) the total number of prior transactions is not equal to one the date span is equal to or mater than two months, and the total number of prior transactions is less than one half of the date span expressed in months; and otherwise,
   (b) assigning the budget item frequency to be monthly.

3. The method of claim 1, wherein the step of determining the budget item amount comprises the steps of:
   (a) assigning the budget item amount to be the sum of all prior transactions occurring over the specified range of time, if the total number of the prior transactions is equal to one; and otherwise
   (b) assigning the budget item amount to be equal to the average amount for the prior transactions occurring over the date span, multiplied by the budget item frequency.

4. The method of claim 1, further comprising the steps of:
   (a) generating a list of prior transactions sorted by at least one category; and
   (b) estimating a budget item for each of said at least one category.

5. The method of claim 4, wherein the step of generating the list of prior transactions sorted by at least one category comprises the steps of:
   (a) accessing at least one account database storing the prior transactions; and
   (b) sorting the prior transactions identified by category into the list of prior transactions.

6. The method of claim 4, further comprising the step of generating a cash flow transaction for use in predicting the cash flow forecast, as a function of the budget item for each of said at least one category.

7. The method of claim 6, wherein the step of generating the cash flow transaction comprises the steps of:
   (a) determining a first date that falls within a forecast date range as a function of the budget item frequency iterated h m January first of a year that includes a start date of the forecast date range;
   (b) applying a posting date criterion to the first date as a function of the budget item frequency, to establish a cash flow transaction date for the cash flow transaction; and
   (c) assigning the budget item amount to the cash flow transaction.

8. The method of claim 7, further comprising the step of generating a cash flow transaction as a function of the budget item for each of said at least one category.

9. The method of claim 8, further comprising the step of generating the cash flow forecast as a function of the cash flow transaction for each of said at least one category.

10. The method of claim 9, further comprising the steps of:
    (a) determining a balance amount as of the start date of the forecast date range;
    (b) applying to the balance amount the cash flow transaction for one of said at least one category, to obtain a running balance; and
    (c) applying to the running balance the cash flow transaction for a next of said at least one category, if a next of said at least one category exists.

11. The method of claim 8, wherein the step of predicting the cash flow forecast is carried out as a function of the cash flow transaction for each of said at least one category and as a function of at least one manually budgeted transaction associated with said at least one category.

12. The method of claim 11, wherein the step of predicting the cash flow forecast comprises the steps of:
    (a) determining a balance amount as of the start date of the forecast date range;
    (b) applying to the balance amount the cash flow transaction for one of said at least one category to obtain a running balance; and
    (c) applying the budgeted transaction associated with said at least one category to the mining balance amount to obtain a new running balance.

13. A machine-readable medium storing machine instructions that cause a processor to perform the steps of claim 1.

14. A computer system for estimating a budget item, for use in predicting a cash flow forecast, comprising:
    (a) a processor;
    (b) a memory in communication with the processor, said memory storing machine instructions and data; and
    (c) said machine instructions comprising an application program that when executed by the processor, causes the processor to perform a plurality of functions, including:
       (i) summing all prior transactions occurring over a specified range of time;

(ii) determining, utilizing an autobudget module executing on the computer, a total number of prior transactions occurring during said specified range of time;

(iii) determining, utilizing the autobudget module executing on the computer, a date span between a first transaction and a last transaction within the specified range of time;

(iv) determining, utilizing the autobudget module executing on the computer, a budget item frequency as a function of the total number of prior transactions, and the date span;

(v) determining, utilizing the autobudget module executing on the computer, an average amount for the prior transactions occurring over the date span;

(vi) determining, utilizing the autobudget module executing on the computer, a budget item amount by scaling the average amount for the prior transactions occurring over the date span, by the budget item frequency; and (vii) using the budget item amount and the budget item frequency to predict the cash flow forecast, wherein the cash flow forecast comprises a daily forecast of transactions over a forecast period comprising at least a future time period, thereby facilitating the understanding of income and spending patterns and the recognition of opportunities to improve a financial situation.

15. The system of claim 14, wherein the machine instructions further cause the processor to:

(a) generate a list of the prior transactions sorted by at least one category; and (b) estimate a budget item for each of said at least one category, wherein each budget item is defined by the budget item amount and the budget item frequency determined from the prior transactions of each category.

16. The system of claim 14, wherein the machine instructions further cause the processor to generate at least one cash flow transaction as a function of the budget item for each of said at least one category, for use in predicting the cash flow forecast.

17. A computer-implemented method for automatically generating a cash flow forecast over a selectable forecast period, comprising the steps of:

(a) generating, utilizing an autobudget module executing on the computer, an autobudget that includes at least one budget item, said autobudget being generated as a function of a budget item frequency and a budget item amount that are based upon at least one prior transaction; and (b) cresting at least one cash flow transaction as a function of the at least one budget item, and the selected forecast period at least a portion of which extends into the future, said at least one cash flow transaction defining said cash flow forecast, wherein the cash flow forecast comprises a daily forecast of transactions over the selected forecast period, thereby facilitating the understanding of income and spending patterns and the recognition of opportunities to improve a financial situation.

18. The method of claim 17, further comprising the step of determining the budget item frequency as a function of:

(a) a count of any prior transactions occurring over a specific period of time; and (b) a date span between a first prior transaction and a last prior transaction within the specific period of time.

19. The method of claim 18, further comprising the step of determining the budget item amount as a function of:

(a) a sum of any prior transactions occurring over the specific period of time;

(b) the date span; and (c) the budget item frequency.

20. The method of claim 18, wherein the step of determining at least one budget item comprises the steps of:

(a) assigning the budget item frequency to be annually if one of the following occurs:
(i) the count of prior transactions is equal to one;
(ii) the count of prior transactions is not equal to one, and the date span is less than two months; and
(iii) the count of prior transactions is not equal to one, the date span is equal to or mater than two months, and the count of prior transactions is less than one half of the date span expressed in months;

(b) assigning the budget item frequency to be weekly if the count of prior transactions is not equal to one, the date span is equal to or greater than two months, the count of prior transactions is equal to or greater than one half of the date span expressed in months, and the count of the prior transactions is greater than a predefined multiple of the date span expressed in months; and otherwise, (c) assigning the budget item frequency to be monthly.

21. The method of claim 19, wherein the step of determining the budget item amount further comprises the steps of:

(a) assigning the budget item amount to be an amount of a single prior transaction occurring during the specified period of time, if the count of prior transactions is equal to one; and otherwise, (b) assigning the budget item amount to be equal to the sum of said prior transactions over the specified period of time, multiplied by the budget item frequency, divided by a number of predefined budget item frequency periods encompassed by the date span.

22. The method of claim 21, further comprising the step of adjusting the predicted cash flow forecast by subtracting from the budget item amount at least one of any post-dated prior transaction and any overdue cash flow transaction.

23. The method of claim 17, wherein the step of mating at least one cash flow transaction comprises the steps of:

(a) determining if the at least one budget item is a one-time budget item, and if so:
(i) assigning a cash flow transaction amount equal to a budget item amount with a posting date that is set equal to a specified date for the at least one budget item, if the specified date is associated with the at least one budget item; and otherwise,
(ii) assigning an equal portion of the cash flow transaction amount to a plurality of cash flow transactions, wherein each of the plurality of cash flow transactions has a different posting date, said different posting dates being equally distributed within a predefined period of time for the at least one budget item; and if not (a), (b) establishing a plurality of cash flow transactions over the selected forecast period, wherein each of the plurality of cash flow transactions has a different posting date defined as a function of a posting date criterion selectable by a user.

24. The method of claim 23, wherein the step of establishing a plurality of cash flow transactions comprises the steps of:

(a) determining if the posting date criterion is defined as Optimistic and the budget item amount is less than zero, and if so, assigning to each of the plurality of cash flow transactions:

(i) a cash flow transaction amount equal to the budget item amount; and
(ii) a posting date that is proximate a last day of each successive period defined by the budget item frequency;
(b) determining if the posting date criterion is defined as Optimistic and the budget item amount is greater than zero, and if so, assigning to each of the plurality of cash flow transactions:
(i) a cash flow transaction amount equal to a budget item amount; and
(ii) a posting date that is proximate a first day of each successive period defined by the budget item frequency;
(c) determining if the posting date criterion is defined as Realistic, and if so, assigning to each of the plurality of cash flow transactions:
(i) a cash flow transaction amount equal to an equal portion of the budget item amount; and
(ii) a posting date that is a selected day of each of a plurality of successive sub-periods defined by subdividing the budget item frequency;
(d) determining if the posting date criterion is defined as Pessimistic and the budget item amount is less than zero, and if so, assigning to each of the plurality of cash flow transactions:
(i) a cash flow transaction amount equal to the budget item amount: and
(ii) a posting date that is proximate a first day of each successive period defined by the budget item frequency; and
(e) determining if the posting date criterion is defined as Pessimistic and the budget item amount is greater than zero, and if so, Assigning to each of the plurality of cash flow transactions:
(i) a cash flow transaction amount equal to the budget item amount; and
(ii) a posting date that is proximate a last day of each successive period defined by the budget item frequency.

25. The method of claim 24, wherein the selected day of the successive sub-periods is one of a first, a last and a middle day of each successive period.

26. The method of claim 17, further comprising the step of creating an additional cash flow transaction as a function of an overdue transaction.

27. The method of claim 17, further comprising the step of creating an additional cash flow transaction as a function of manually entered budget item.

28. The method of claim 17, further comprising the steps of:
(a) determining a balance at a beginning of the selected forecast period; and
(b) applying the at least one cash flow transaction to the balance to create a first running balance.

29. The method of claim 28, further comprising the step of displaying the first running balance in one of a graphical and a list form.

30. The method of claim 28, further comprising the step of enabling a user to modify the at least one cash flow transaction, causing a second running balance to be determined.

31. The method of claim 30, further comprising the step of displaying the second running balance in place of the first running balance.

32. The method of claim 30, further comprising the step of displaying the second running balance in addition to the first running balance.

33. A machine-readable medium storing machine instructions that cause a processor to perform the steps of claim 17.

34. A computer system for generating a cash flow forecast, comprising:
(a) a processor;
(b) a display coupled to the processor;
(c) a user input device coupled to the processor; and
(d) a memory in communication with the processor, said memory storing machine instructions and data, said machine instructions comprising an application program that when executed by the processor, causes the processor to perform a plurality of functions, including:
(i) generating, utilizing an autobudget module executing on the computer, an autobudget that includes at least one budget item, said autobudget being generated as a function of a budget item frequency and a budget item amount that are based upon at least one prior transaction; and
(ii) creating at least one cash flow transaction as a function of the at least one budget item, and the selected forecast period, at least a portion of which extends into the future, said at least one cash flow transaction defining said cash flow forecast, wherein the cash flow forecast comprises a daily forecast of transactions over the selected forecast period, thereby facilitating the understanding of income and spending patterns and the recognition of opportunities to improve a financial situation.

35. The system of claim 34, wherein said machine instructions further cause the processor to determining the budget item frequency as a function of:
(a) a count of any prior transactions occurring over a specific period of time; and
(b) a date span between a prior transaction and a last prior transaction within the specific period of time.

36. The system of claim 34, wherein said machine instructions further cause the processor to determining the budget item amount as a function of:
(a) a sum of any prior transactions occurring over the specific period of time;
(b) the date span; and
(c) the budget item frequency.

37. The system of claim 34, wherein said machine instructions further cause the processor to determine the budget item frequency by:
(a) assigning the budget item frequency to be annually if one of the following occurs:
(i) the count of prior transactions is equal to one;
(ii) the count of prior transactions is not equal to one, and the date span is less than two months, and
(iii) the count of prior transactions is not equal to one, the date span is equal to or mater than two months, and the count of prior transactions is less than one half of the date span expressed in months;
(b) assigning the budget item frequency to be weekly if the count of prior transactions is not equal to one, the date span is equal to or greater than two months, the count of prior transactions is equal to or greater than one half of the date span expressed in months, and the count of the prior transactions is greater than a predefined multiple of the date span expressed in months; and otherwise,
(c) assigning the budget item frequency to be monthly.

38. The system of claim 34, wherein said machine instructions further cause the processor to create the at least one cash flow transaction by:
(a) determining if the at least one budget item is a one-time budget item, and if so:

(i) assigning a cash flow transaction amount equal to a budget item amount with a posting date that is set equal to a specified date for the at least one budget item, if the specified date is associated with the at least one budget item; and otherwise, (ii) assigning an equal portion of the cash flow transaction amount to a plurality of cash flow transactions, wherein each of the plurality of cash flow transactions has a different posting date, said different posting dates being equally distributed within a predefined period of rime for the at least one budget item; and if not (a), (b) establishing a plurality of cash flow transactions over the selected forecast period, wherein each of the plurality of cash flow transactions has a different posting date defined as a function of a posting date criterion selectable by a user.

39. The system of claim 38, wherein said machine instructions further cause the processor to create the plurality of cash flow transactions by:

(a) determining if the posting date criterion is defined as Optimistic and the budget amount is less than zero, and if so, assigning to each of the plurality of cash flow transactions:
(i) a cash flow transaction amount equal to the budget item amount; and
(ii) a posting date that is proximate a last day of each successive period defined by the budget item frequency;

(b) determining if the posting date criterion is defined as Optimistic and the budget amount is greater than zero, and if so, assigning to each of the plurality of cash flow transactions:
(i) a cash flow transaction amount equal to a budget item amount; and
(ii) a posting date that is proximate a first day of each successive period defined by the budget item frequency;

(c) determining if the posting date criterion is defined as Realistic, and if so, assigning to each of the plurality of cash flow transactions:
(i) a cash flow transaction amount equal to an equal portion of the budget item amount; and
(ii) a posting date that is a selected day of each of a plurality of successive sub-periods defined by subdividing the budget item frequency;

(d) determining if the posting data criterion is defined as Pessimistic and the budget amount is less than zero, and if so, assigning to each of the plurality of cash flow transactions:
(i) a cash flow transaction amount equal to the budget item amount; and
(ii) a posting date that is proximate a last day of each successive period defined by the budget item frequency; and (e) determining if the posting data criterion is defined as Pessimistic and the budget amount is mater than zero, and if so, assigning to each of the plurality of cash flow transactions:
(i) a cash flow transaction amount equal to the budget item amount; and
(ii) a posting date that is proximate a last day of each successive period defined by the budget item frequency.

40. The system of claim 34, wherein said machine instructions further cause the processor to:
(a) determine a balance at a beginning of the selected forecast period, and
(b) apply the at least one cash flow transaction to the balance to create a first running balance.

41. The system of claim 40, wherein said machine instructions further cause the processor to display the first running balance in one of a graphical and a list form on the display.

42. The system of claim 41, wherein said machine instructions further cause the processor to enable a user to select with the user input device, a portion of the graphical form of the first running balance displayed on the display, wherein said selection causes processor to display on the display the at least one cash flow transaction associated with the selected portion of the graphical form of the running balance.

43. The system of claim 40, wherein said machine instructions further cause the processor to enable a user to modify the at least one cash flow transaction, causing a second running balance to be determined.

* * * * *